United States Patent [19]
Ito et al.

[11] Patent Number: 5,786,594
[45] Date of Patent: Jul. 28, 1998

[54] MULTI-BEAM PITCH ADJUSTMENT SYSTEM AND METHOD

[75] Inventors: Tatsuya Ito; Tomohiro Nakajima, both of Tokyo; Katsumi Yamaguchi, Yokohama; Akira Shimura, Kanagawa; Masaki Narita, Tokyo; Shuichi Yamazaki, Fiujimi; Satoru Ito, Yokohama, all of Japan

[73] Assignee: Ricoh Company, Ltd., Japan

[21] Appl. No.: 786,203

[22] Filed: Jan. 21, 1997

[30] Foreign Application Priority Data

| Jan. 18, 1996 | [JP] | Japan | 8-006273 |
| Jan. 19, 1996 | [JP] | Japan | 8-007861 |
| Mar. 1, 1996 | [JP] | Japan | 8-068982 |
| Mar. 12, 1996 | [JP] | Japan | 8-081899 |
| May 31, 1996 | [JP] | Japan | 8-159254 |
| May 17, 1996 | [JP] | Japan | 8-123342 |
| Jul. 25, 1996 | [JP] | Japan | 8-213278 |
| Jul. 26, 1996 | [JP] | Japan | 8-197791 |
| Nov. 13, 1996 | [JP] | Japan | 8-302172 |

[51] Int. Cl.$^6$ ............................................. H04N 1/36
[52] U.S. Cl. ......................................... 250/236; 358/474
[58] Field of Search ................................. 250/234–236; 358/474, 481, 493, 494

[56] References Cited

U.S. PATENT DOCUMENTS

| 5,371,608 | 12/1994 | Muto et al. | 358/474 |
| 5,615,038 | 3/1997 | Suzuki et al. | 250/235 |

FOREIGN PATENT DOCUMENTS

| 56-42248 | 4/1981 | Japan . |
| 93-03417 | 9/1993 | Japan . |

OTHER PUBLICATIONS

Article (in Japanese) by Nakamori entitled "Fuji–Xerox Development of 2–Beam Writing Unit In Laser Printer," Nikkei Electronics, Jun. 19, 1995 (No. 638), p. 18.

Article (in Japanese) by Fukui, et al. entitled "DualSpot Scanning System Technology Utilized in DocuStation DP300," Fuji Xerox Technical Report, No. 10, 1995, pp. 132–137.

Article by Mochizuki, et al. entitled "Dual Beam Diode Laser Scanning System for High Speed Laser Beam Printers," The 9th International Congress on Advances in Non–Impact Printing Technologies/Japan Hardcopy '93, Oct. 4–8, 1993, pp. 222–225.

*Primary Examiner*—Stephone B. Allen
*Attorney, Agent, or Firm*—Knoble & Yoshida LLC

[57] ABSTRACT

The current disclosure discloses methods of and systems for automatically adjusting or selecting a pitch between beams in a multi-beam scanning system. An array of light sources is mounted on a rotatable housing and emits light in a direction perpendicular to the rotational plane. The system or method measures a pitch on or near an intermediate image-forming surface. In response to the measured pitch, the scanning as well as sub-scanning pitch is automatically adjusted or selected by rotating a housing unit to maintain a desired pitch.

74 Claims, 28 Drawing Sheets

MULTI-BEAM PITCH ADJUSTMENT SYSTEM AND METHOD

FIELD OF THE INVENTION

The current invention is generally related to a method of and a system for automatically adjusting the pitch in a multi-beam optical system, and more particularly related to a method of and a system for measuring the pitch between a plurality of beams on a photoreceptor drum and adjustably rotating a laser diode array unit to maintain or initialize a predetermined desired pitch.

BACKGROUND OF THE INVENTION

To increase the efficiency in image duplicating devices such as copiers, printers and facsimile machines, a scanning speed in the image forming process has been improved in prior art. In general, a scanner has a rotatable polygon mirror having multiple reflecting surfaces, and as the scanner is rotated at as high as 20,000 revolutions per minute, a beam of light is scanned in a predetermined direction on an intermediate image-forming surface to form an image thereon. Thus, a scanning angle is defined as a relative angular range of the rotatable reflecting surface about its rotational axis for covering the horizontal scan distance on the intermediate image-forming surface. However, at the high rotational speed, a number of undesirable effects needs to be considered. For example, due to the high rotational speed, noise and heat are undesirably increased. Furthermore, other associated problems include a shortened lifetime of a driving motor, an expensive bearing unit, a need for a high-intensity laser unit and etc. These problems are generally worsened as the rotational speed is further increased. The costs for solving these associated problems are prohibitive, and another approach is necessary.

Rather than increasing the rotational speed of a scanner, multiple laser beams are simultaneously scanned to shorten an amount of time to form an image on an intermediate image forming surface. For example, Nikkei Electronics, Jun. 19, 1995 and Fuji Xerox Technical Report No. 10, 1995 both disclose a dual spot laser diode chip for emitting separate beams at a distance of approximately 10 microns apart. These emitted beams are processed by a single optical system including a collimator lens. In theory, the scanning time is shortened by a factor of the number of beams. In other words, if three beams were used, it would take only one third of the time using a single laser beam to form the same image on the intermediate image forming surface. To take advantage of the multiple beams, a pitch in the vertical direction or a sub-scanning pitch between beams needs to be correctly calibrated for a predetermined recording density. The sub-scanning direction is perpendicular to the above-described scanning direction. For example, at 400 dots per inch (dpi), the sub-scanning pitch is calibrated approximately at 63.5 μm while at 600 dpi, the pitch is approximately 42.3 μm.

In order to calibrate the sub-scanning pitch of multiple beams, one type in prior art attempts includes a rotatable housing unit. Japanese Patent 56-42248 discloses a rotatable array-laser housing unit. An array laser unit is mounted on a housing unit which is rotatable about an axis substantially parallel to a light path of the laser beam for calibrating the pitch between the beams. For example, the array laser unit is mounted on a rotatable housing unit and emits two beams Beam 1 and Beam 2 in perpendicular to a rotational plane of the housing. When the housing unit is rotated along a light-emitting axis of the Beam 1, as shown in FIG. 1, the sub-scanning pitch or the vertical distance between the two beams Beam 1 and Beam 2 is varied depending upon the position of Beam 2 with respect to that of Beam 1. In other words, the sub-scanning pitch is $P_1$, when the Beam 2 is positioned at $\theta_1$ with respect to the Beam 1 in the scanning direction. Similarly, the sub-scanning pitch is $P_2$ when the Beam 2 is positioned at $\theta_2$ while the sub-scanning pitch is $P_3$ when the Beam 2 is positioned at $\theta_3$. Both Beam 1 and Beam 2 are scanned in a predetermined scanning direction as indicted in arrows, and the horizontal distance or a scanning pitch at the sub-scanning pitch of $P_1$ is shown as L. After a sub-scanning pitch is manually calibrated, the housing unit is fixed at the calibrated position by a set of screws. Similarly, Japanese Patent Application 93-03417 also discloses a rotatable multi-beam light source housing unit which integrates both semiconductor laser elements and collimator lenses. The sub-scanning pitch between the laser beams is initially calibrated by rotating the housing unit and is fixed at the calibrated position by gluing a rotation knob.

Despite the above-described initial calibration, the pitch in multiple-beam image-forming units is unstable over a long-term use. The pitch between beams in both scanning and sub-scanning directions is affected by a number of factors including an operating temperature. The room temperature ranges from 10° to 32°C. while the internal operating temperature of certain units in an image duplicating device may reach near 55°C. Consequently, the thermal expansion in mechanical and optical parts affects the pitch between the beams and prevents a multi-beam scanning system from forming an accurate image on an intermediate image-forming surface. To maintain the calibrated or desired pitch between the beams, one group of attempts includes "Dual Beam Diode Laser Scanning System for High Speed Laser Beam Printers," pp 222–225, Mochizuki et al. that discloses a system for integrating beams generated by two separate laser sources into a single optical output with a predetermined pitch.

Referring to FIG. 2, a pair of movable reflecting surfaces 104a and 104b independently directs the beams emitted by lasers 107a and 107b, and the pitch is adjusted by changing an angle of these reflecting mirrors 104a and 104b in response to a pitch measured by a sensor 102 which is not located to detect the beams on a photoreceptor drum 111. Although the sub-scanning pitch is adjustable during the operation, the exact adjustment of the independently movable mirrors 104a and 104b poses some technical difficulty. In addition, the pitch is not accurately measured since the measured beam positions are not identical to those on a photoreceptor drum 111. The measurement is taken before the beams enter into an optical element 112 and a scanner 110.

In order to select or adjust the sub-scanning pitch in a multi-beam scanning system, an accurate and simplified approach is desired.

SUMMARY OF THE INVENTION

To solve the above and other problems, according to one aspect of the current invention, a method of adjusting a pitch between beams on an intermediate image-forming surface, a plurality of light sources being placed in an array on a rotatable unit, including the steps of: a) emitting a plurality of substantially parallel beams from the light sources; b) measuring a distance between the emitted beams; and c) automatically rotating the rotatable unit about an axis in parallel to at least one of the emitted beams based upon the measured distance for adjusting the pitch substantially close to a predetermined desired pitch.

According to a second aspect of the current invention, a method of selecting a pitch between a pair of beams on an intermediate image-forming surface, a plurality of light sources each emitting at least one beam along an optical axis, including the steps of: o') selecting a pair of adjacent beams emitted by a common light source; p') independently selecting a desired pitch distance between the selected pair of the adjacent beams; and q') rotating the common light source about an axis in parallel to at least one of the optical axes in response to the selected pitch distance for initializing the pitch at the selected pitch distance.

According to a third aspect of the current invention, a method of adjusting a pitch between a pair of beams on an intermediate image-forming surface, a plurality of light sources each emitting at least one beam, including the steps of: r') emitting a plurality of beams; s') selecting a pair of adjacent beams emitted from a single one of the light sources; t') measuring the pitch between the emitted beams in a sub-scanning direction; and u') rotating the single light source about an axis in parallel to at least one of the emitted beams based upon the measured pitch for maintaining a predetermined desired pitch.

According to a fourth aspect of the current invention, a system for adjusting a pitch between beams on an intermediate image-forming surface, including: a rotatable unit having a plurality of light sources placed in a single array, the light sources emitting a plurality of substantially parallel beams; a pitch measuring unit for measuring a pitch distance between the emitted beams, the pitch measuring unit generating a pitch signal indicative of the pitch distance; and a rotation control unit in response to the pitch signal causing the rotatable unit to rotate about an axis in parallel to at least one of the emitted beams for adjusting the pitch substantially close to a predetermined desired pitch.

According to a fifth aspect of the current invention, a system for selecting a pitch between a pair of beams on an intermediate image-forming surface, including: a plurality of individually rotatable light sources each emitting at least one beam along an optical axis; a pitch control unit for selecting a pair of adjacent beams emitted by a common light source and a desired pitch distance between the selected pair of the adjacent beams; and a rotation control unit for rotating the common light source about an axis in parallel to at least one of the optical axes in response to the selected pitch distance for initializing the pitch at the selected pitch distance.

According to a sixth aspect of the current invention, a system for adjusting a pitch between a pair of beams on an intermediate image-forming surface, including: a plurality of individually rotatable light sources each emitting at least one beam along an optical axis; a pitch measuring unit for measuring a pitch between a pair of adjacent beams emitted by a common light source; and a rotation control unit for rotating the common light source about an axis in parallel to at least one of the optical axes based upon the measured pitch for adjusting the measured substantially close to a predetermined desired pitch.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 3:
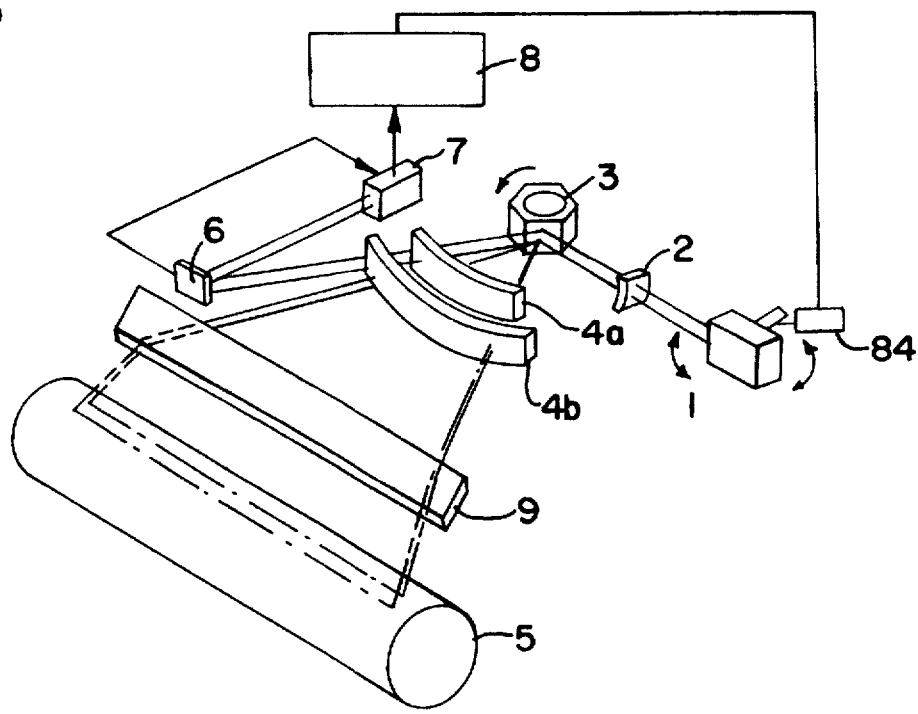
FIG. 3 conceptually illustrates one preferred embodiment of the multi-beam pitch adjustment system according to the current invention.

Referring now to the drawings, wherein like reference numerals designate corresponding structure throughout the views, and referring in particular to FIG. 3, one preferred embodiment of the multi-beam pitch adjustment system according to the current invention includes a rotatable light source unit or rotatable unit 1 for rotatably positioning light sources which emit multi beams. In general, the housing unit is rotated about an axis in parallel to one of emitted light paths as indicated by a pair of double headed arrows. The emitted multi beams are projected onto a rotatable scanning device such a polygon mirror 3 via an optical lens 2. The scanner 3 rotates its polygon mirror surfaces at a predetermined angular velocity in a predetermined direction as indicated by another arrow. The beams are scanned within a predetermined scanning angle, and the scanned beams enter into a pair of lenses 4a and 4b and a reflector 9 before reaching an intermediate image-forming surface such as a photo receptor drum 5. The above-described optical lens system is merely exemplary and does not require a certain lens combination.

Still referring to FIG. 3, in order to maintain a predetermined desired pitch between beams on the intermediate image forming surface 5, after the beams have exited the optical lenses 4a and 4b, a pitch is measured by a beam detection unit 6 located near the photo receptor drum 5. A pitch calculation unit 7 calculates the measured pitch and determines a difference between the measured pitch and a predetermined desired pitch. The difference is an amount of adjustment to maintain the desired pitch. A rotational control unit 8 converts the adjustment amount in distance to an angle or a number of pulses to activate a stepping motor 84 which causes the rotatable unit 1 to rotate. The above-described feed-back loop allows the system to maintain the predetermined desired pitch between the beams on the intermediate image-forming surface. By the same token, the desired pitch is initially selected to accommodate a desired recording density, and the selected pitch is obtained by similarly rotating the rotatable unit. The initially selected pitch is maintained by the above-described same feed-back information based upon the direct measurement.

Figure 4:
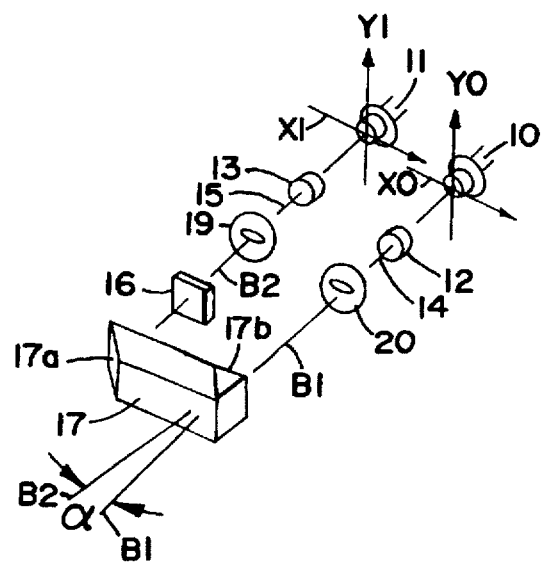
FIG. 4 illustrates a perspective view of one preferred embodiment of the light emitting source according to the current invention.
Figure 1:
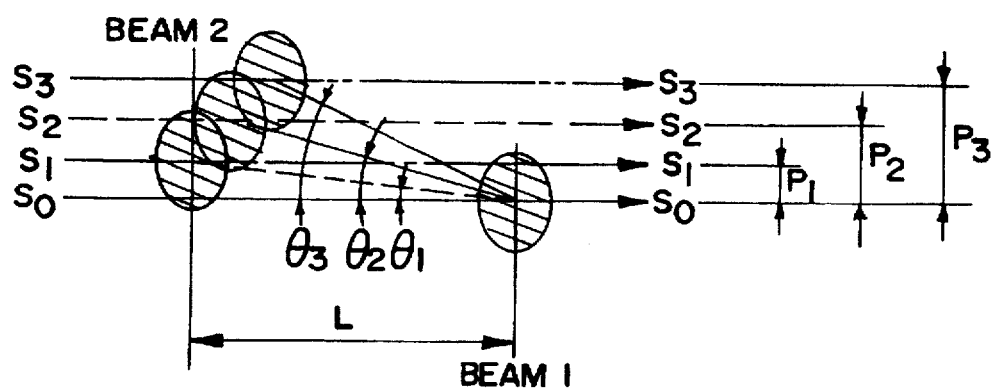
FIG. 1 diagrammatically illustrates a change in a sub-scanning pitch between beams as the two beams are rotated.
Figure 2:
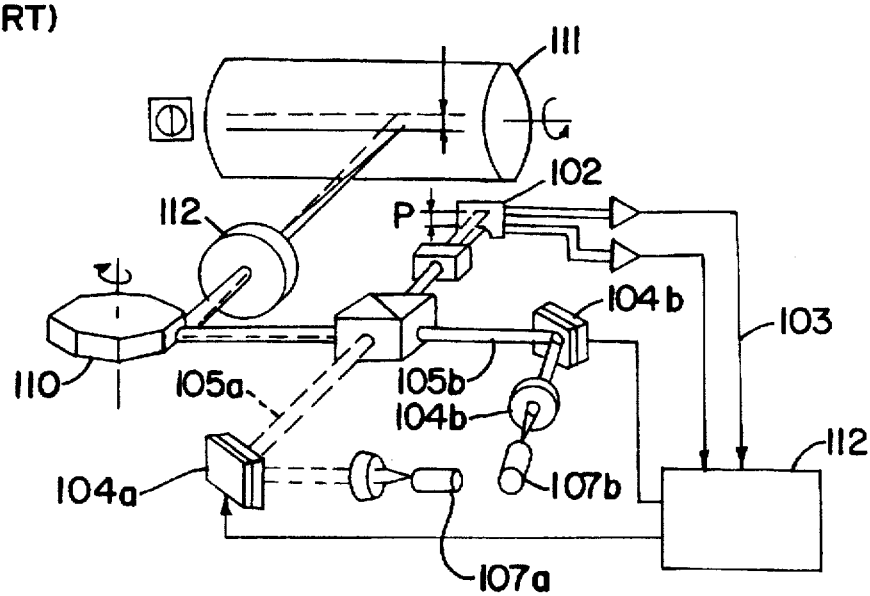
FIG. 2 is a prior art two-beam sub-scanning pitch adjustment system using a pair of movable reflecting surfaces.

Now referring to FIG. 4, the rotatable light housing unit houses a plurality of light sources. According to one preferred embodiment of the light sources, a pair of light emitting elements 10 and 11 such as laser diodes is placed in an array, and the center of each light emitting diode 10 and 11 is indicated by an origin of the XY axes. The two pairs of XY axes (X0,Y0 and X1,Y1) are at least parallel to each other, and the X axes may be coinciding on the same line. Each of the light emitting elements 10 and 11 respectively projects light in the direction perpendicular to a respective X-Y plane through its origin towards a corresponding collimator lens 12 or 13. The collimator lenses 12 and 13 convert the emitted light into substantially parallel arrays of light 14 and 15, and the parallel beams 14 and 15 enter respective apertures 20 and 19. After exiting the apertures 19 and 20, a beam B2 enters into a ½ wave plate 16 for altering a plane of polarization by 90 degrees. The beam B2 then enters a prism 17 and reflected by an internal surface 17a and a beam splitter reflecting surface 17b before exiting the prism 17. On the other hand, the beam B1 enters the beam splitter 17b in the prism 17 from the opposite side and exits the prism 17 without being reflected. As a result, the beams B1 and B2 are placed substantially close with each other, and the angle formed by optical axes of the beams B1 and B2 is a predetermined angle α, which is caused by an amount of eccentricity between the laser diode 11 and the collimator lens 13.

Figure 5:
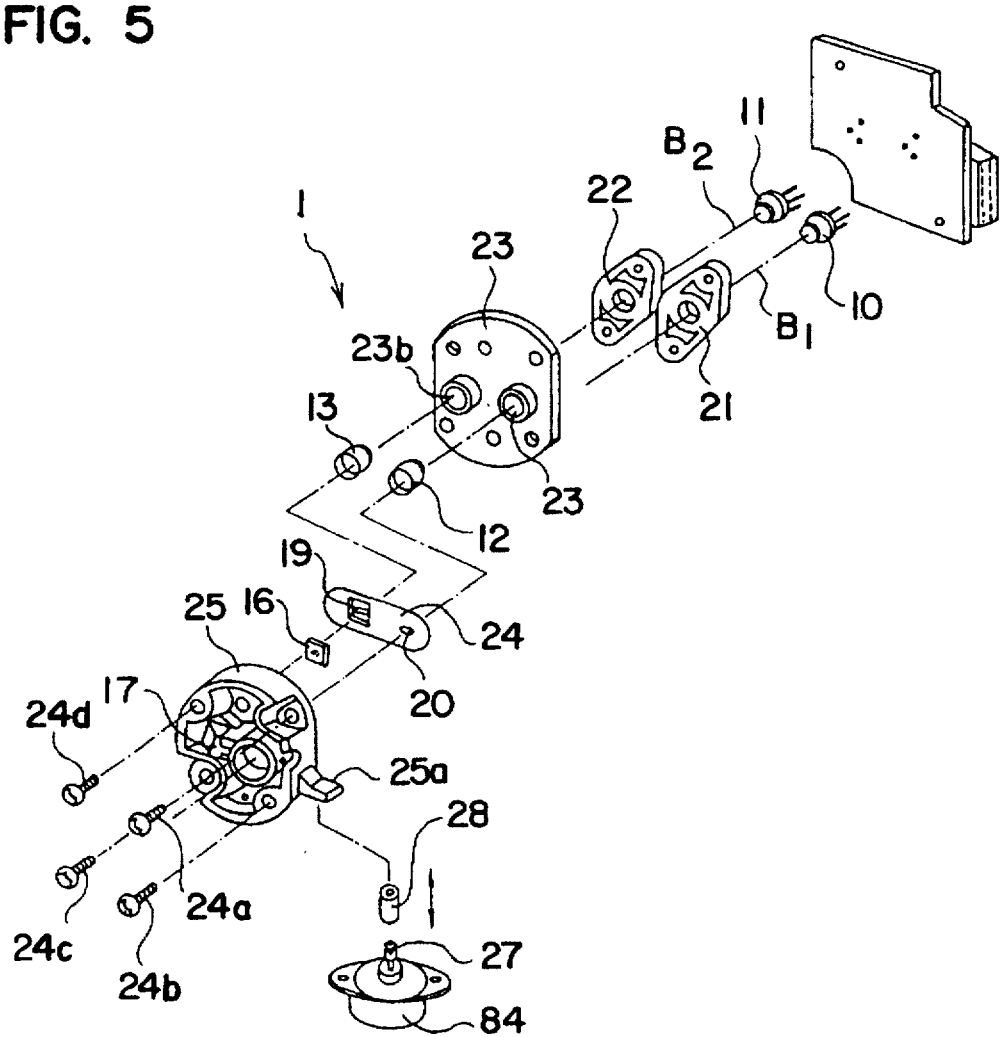
FIG. 5 is a detailed expanded perspective view of the preferred embodiment of the rotatable light source unit according to the current invention.

Now referring to FIG. 5, the above-described light sources are placed in one preferred embodiment of the rotatable housing unit 1 according to the current invention. The elements that have been already described in reference to FIG. 4 bear the same reference numbers, and the corresponding descriptions are not reiterated but incorporated herein. The laser diodes 10 and 11 are placed in respective laser element holders 21 and 22, which are mounted on a collimator lens housing unit 23. The collimator lenses 12 and 13 are held in respective through holes 23a and 23b. An aperture plate 24 consists of the two apertures 19 and 20 as well as a place for holding the wave plate 16. The above-described elements are ultimately mounted on a main plate 25 via a set of screws 24a–24d. The rotatable housing unit 1 has an arm 25a protruding from an outer surface away from the center of the main plate 25. A movable member 28 is mounted on a shaft 27 of a stepping motor 84, and the movable member 28 contacts the arm 25a. As the movable member is driven by the motor 84 in a direction indicated by a double headed arrow 29 and engages the arm 25a, the rotatable unit 1 is caused to rotate about a predetermined rotational axis of the housing 1.

Figure 6:
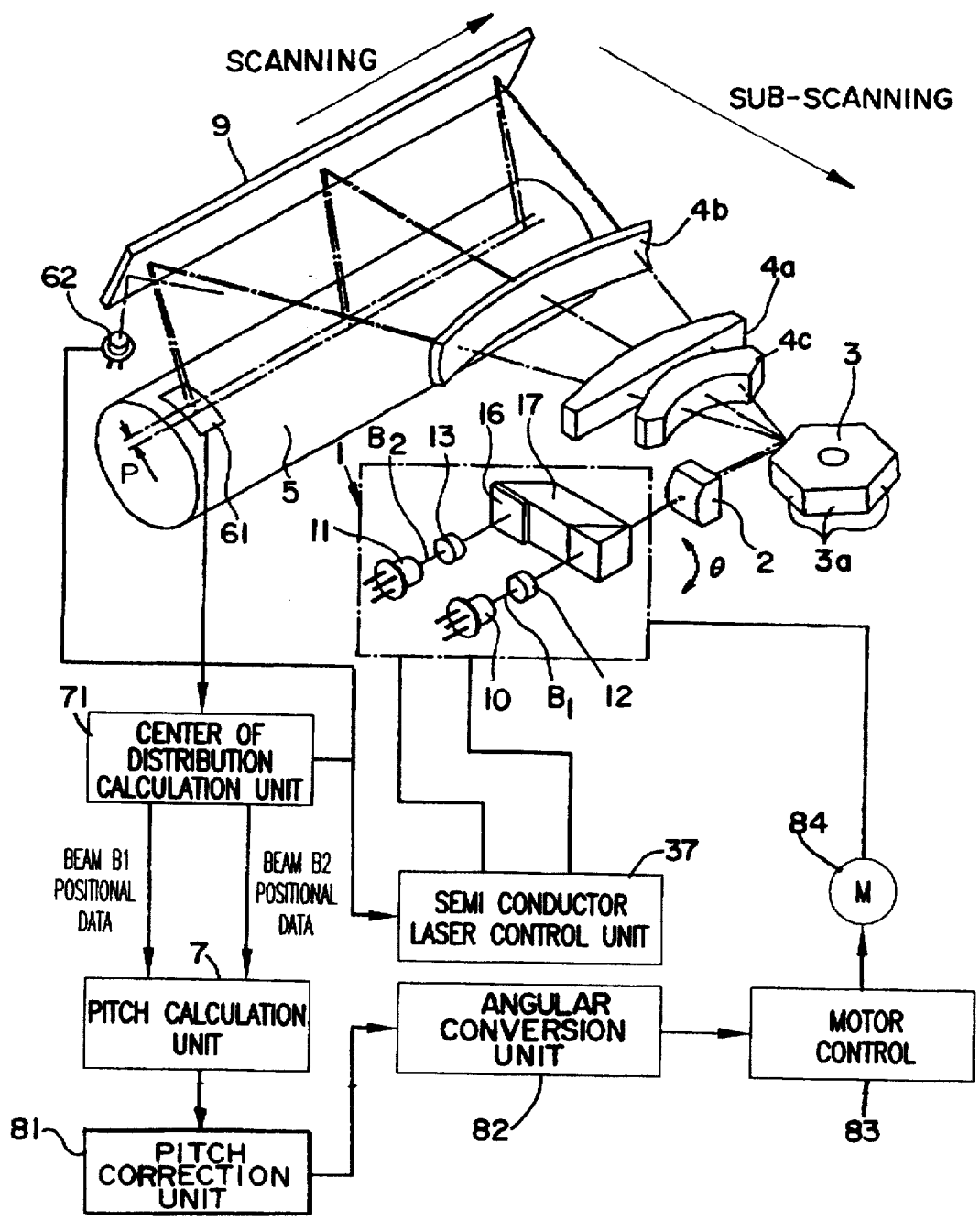
FIG. 6 conceptually illustrates some detailed units of one preferred embodiment of the multi-beam pitch adjustment system according to the current invention.

Referring to FIG. 6, one preferred embodiment of the multi-beam pitch adjustment system according to the current invention is illustrated to show some detail components of the control units in measuring a pitch near or on a photoreceptor drum 5. Except for the following newly introduced units, the above-described components are referred by the same reference numerals, and the above descriptions are incorporated herein. In this embodiment, although an additional lens 4c is used, it is not necessary to practice the current invention. An onset of each scanning cycle is detected by a scanning cycle detector or synchronization sensor 62, which is placed near an edge where each scanning cycle is initiated. The scanning cycle detector 62 generates a synchronization signal upon detecting a beam. The synchronization signal is sent to a light source control unit or a semiconductor laser control unit 37, which controls the onset timing of light sources or laser emitting sources 10 and 11. During the normal writing operation, the above synchronization signal is used to simultaneously initiate the two light sources 10 and 11, and the light source control unit 37 independently activates the light sources 10 and 11 according to the image data in order to form a desired image on a photo receptor drum 5. On the other hand, in order to measure the pitch, the laser control unit 37 is placed in a sub-scanning pitch measuring mode, and during this mode, the laser control unit 37 sequentially activates one light at a time during each scan.

Still referring to FIG. 6, during the sub-scanning pitch measuring mode, a constantly activated test beam from either of the light sources 10 and 11 is scanned at a time in a scanning direction as indicated in an arrow along the length of a photo receptor drum 5. A linear photo sensor 61 such as a patch of a charge-couple device (CCD) is placed outside of an image forming area but within a reach of the test beam on a photo receptor drum 5. Upon detecting the above-described test beam, the photo sensor 61 outputs a positional signal indicative of the position of the respective beam on the photo sensor 61 to a pitch calculation unit 7. The above positional signal includes B1 and B2 positional data respectively correspond to the position of Beams B1 and B2 on the photo sensor 61.

Other units in FIG. 6 process the measured data and rotate a rotatable housing unit 1 to adjust the pitch between the two beams in a sub-scanning direction as indicated by an arrow perpendicular to the scanning direction. Based upon the B1 and B2 positional data, the pitch calculation unit 7 calculates a measured sub-scanning pitch or vertical distance between the two beams in the sub-scanning direction on the photo sensor 61, which is located on the photo receptor drum 5. The pitch calculation unit 7 outputs a measured sub-scanning pitch signal indicative of the measured sub-scanning pitch to a pitch correction unit 81. In response to the measured sub-scanning pitch signal, the pitch correction unit 81 in turn determines whether or not any adjustment is necessary based upon a difference in distance between the measured sub-scanning pitch and a predetermined sub-scanning pitch. If the adjustment is necessary, the pitch correction unit 81 outputs a correction distance to an angular conversion unit 42, which converts the correction distance into a correction angle based upon a conversion table or calculates an angle on the fly. Lastly, the above converted information is outputted to a motor control unit 83 which further converts the angular information into a number of pulses for a stepping motor 84 to cause the housing unit to rotate the above angle in order to adjust the sub-scanning pitch substantially close to a predetermined desired pitch value.

In addition to adjusting the pitch, the above-described units associated with the rotation of the rotatable housing unit 1 are also used to change a recording density level. Although not illustrated in FIG. 6, a sub-scanning pitch is initially selected for a desired recording density level, and in response to the selected density value, the motor control 83 causes the rotatable housing unit 1 to rotate to a corresponding angular position at which the vertical pitch between the beams is changed to the selected sub-scanning pitch. Thereafter, in order to maintain the selected sub-scanning pitch, the above-described adjustment process is performed.

Figure 8:
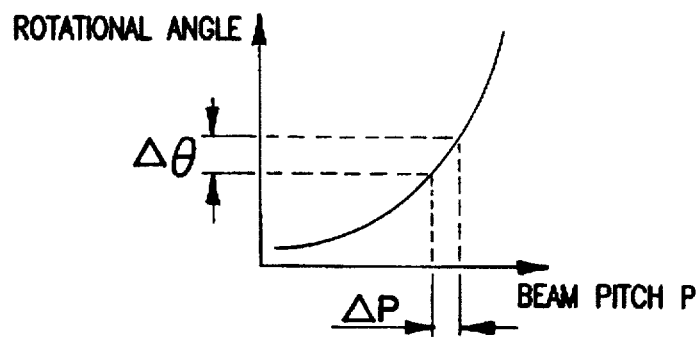
FIG. 8 is a graph describing a conceptual relation between a pitch and a rotational angle.
Figure 7:
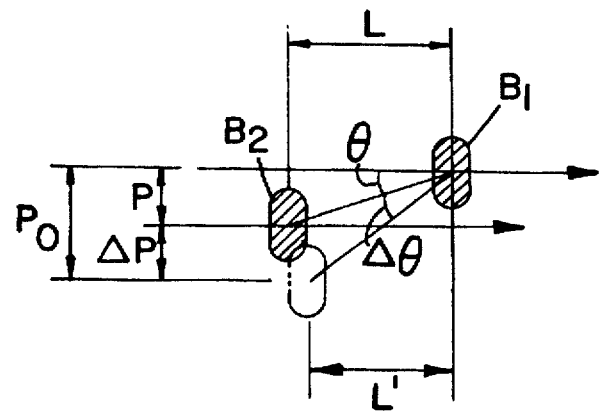
FIG. 7 illustrates that a sub-scanning pitch between two beams is adjusted as the light beams are rotated.

The angular conversion unit 42 converts the correction distance into a correction angle based upon a conversion table or an equation. One example of the equation for the above conversion is shown below:

$$\Delta\theta = \sin^{-1}\{(P_0-p)\sqrt{(L^2+P^2)}\}$$
$$\approx \sin^{-1}\{(P_0-p)/L\}$$

where, referring to FIG. 7, P is the measured sub-scanning pitch between the two beams B1 and B2, $P_0$ is a predetermined desired pitch, $\Delta P$ is the correction distance, L is a scanning or horizontal pitch between the two beams B1 and B2, and $\Delta\theta$ is a correction angle to rotate the rotatable unit about the beam B1 so that the beam B2 is positioned to have the desired sub-scanning pitch $P_0$. As the sub-scanning pitch is adjusted to the desired distance $P_0$, the horizontal distance or scanning pitch between the two beams B1 and B2 is also adjusted from L to L'. Referring to FIG. 8, the above-described equation may be summarized in a graphical form. When the conversion table is used for different recording densities, the table should appear similar to the following example:

| dpi | pitch (μm) | angle (°) | relative angle (°) |
| --- | --- | --- | --- |
| 300 | 84.7 | 6.66 | 3.33 |
| 400 | 63.3 | 4.99 | 1.66 |
| 480 | 52.9 | 4.16 | 0.83 |
| 600 | 42.3 | 3.33 | 0 |

Referring back to FIG. 6, the scanning unit or a polygon mirror 3 is a factor contributing to an error in measuring the above-described sub-scanning pitch. The polygon mirror 3 has a predetermined number of reflecting surfaces 3a, which are each calibrated to be positioned perpendicularly to the light traveling path. However, over a course of use, for example, some of these reflecting surfaces 3a may not be maintained substantially perpendicular to the light path. As a result, these irregular reflecting surfaces 3a reflect the beam in an undesired direction, and the reflect beam reaches an aberrant position on a photo sensor 61, and the aberrant position is deviated from the positions reached by the beam reflected by other substantially perfect reflecting surfaces. The measurements of these aberrant positions contribute to an error in determining the sub-scanning pitch.

Figure 9:
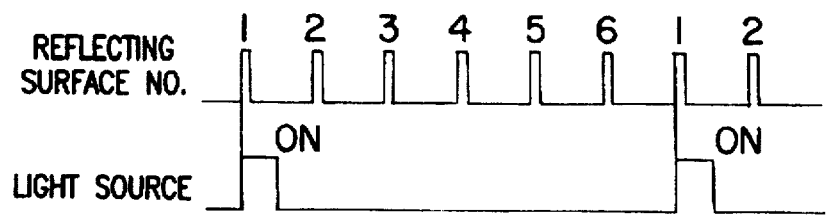
FIG. 9 is a timing diagram for a light source in relation to a predetermined reflecting surface on a rotatable multi-surfaced mirror.

In order to substantially eliminate the above-described undesirable measurements, the light source control unit 37 is activated in such a manner to use only a certain reflecting surface 3a. Now referring to FIG. 9, one example of the above-described selected activation of the light source during the measurement mode is graphically illustrated. A polygon mirror in this example is assumed to have 6 reflecting surfaces, and the first reflecting surface is also assumed to be a substantially ideal reflecting surface. Under such conditions, for example, the light source control unit 37 activates the light sources 10 and 11 only when the selected reflecting surface is used to scan the activated test beam in order to collect the positional data from only a selected desired reflecting surface. Another example of selective activation includes that the light source control activates one light source so that its beam is reflected from even numbered surfaces while the other light source so that the corresponding beam is reflected from odd numbered surfaces. This alternate activation minimizes interference of the emitted light on the photo sensor while allowing the multiple selective reflecting surfaces for each light source.

Figure 10A:
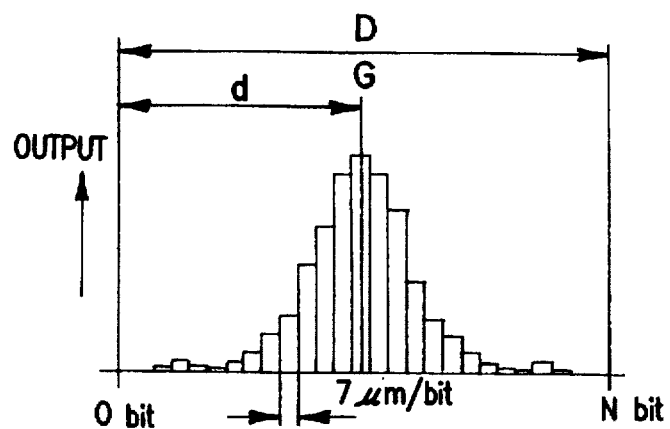
FIG. 10A is a graph showing one exemplary set of cumulative positional measurements of a beam reflected by a multi-surfaced rotatable device.
Figure 10B:
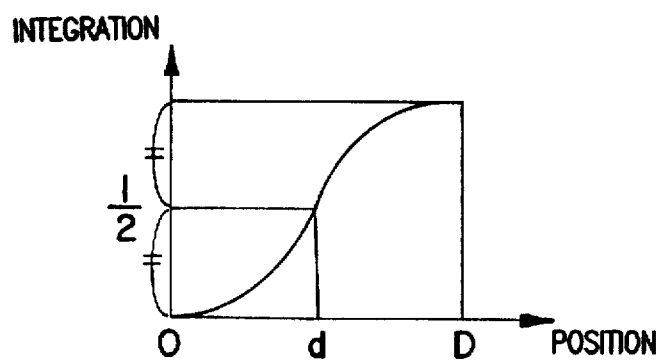
FIGURE 10B is a graph showing integrated measurement data as shown in FIG. 10A.

Referring back once again to FIG. 6, the above-described preferred embodiment of the multi-beam pitch adjustment system according to the current invention further includes a center of distribution calculation unit 71. In the alternative to the above-described selection, the measurements from all the reflecting surfaces are further processed to substantially eliminate the error factor. In general, the distribution unit collects the positional data from all surfaces and processes the data to determine a theoretical center of distribution of the collected positional data as illustrated in FIGS. 10A and 10B. For each reflected beam, the positional data is accumulated based upon a predetermined number of bits or divided positional ranges. FIG. 10A shows one example of distribution of the cumulative positional data collected by twenty-three 7 μm bits or patches of the photo sensor. However, the positional data from selected reflecting surfaces may be processed in the same manner as described above. The collected positional data is then processed to determine a center of the distribution for each beam as shown in FIG. 10B. The center of the distribution is defined to be a corresponding distance which equally divides the area under the integrated distribution curve.

Figures 11A, 11B:
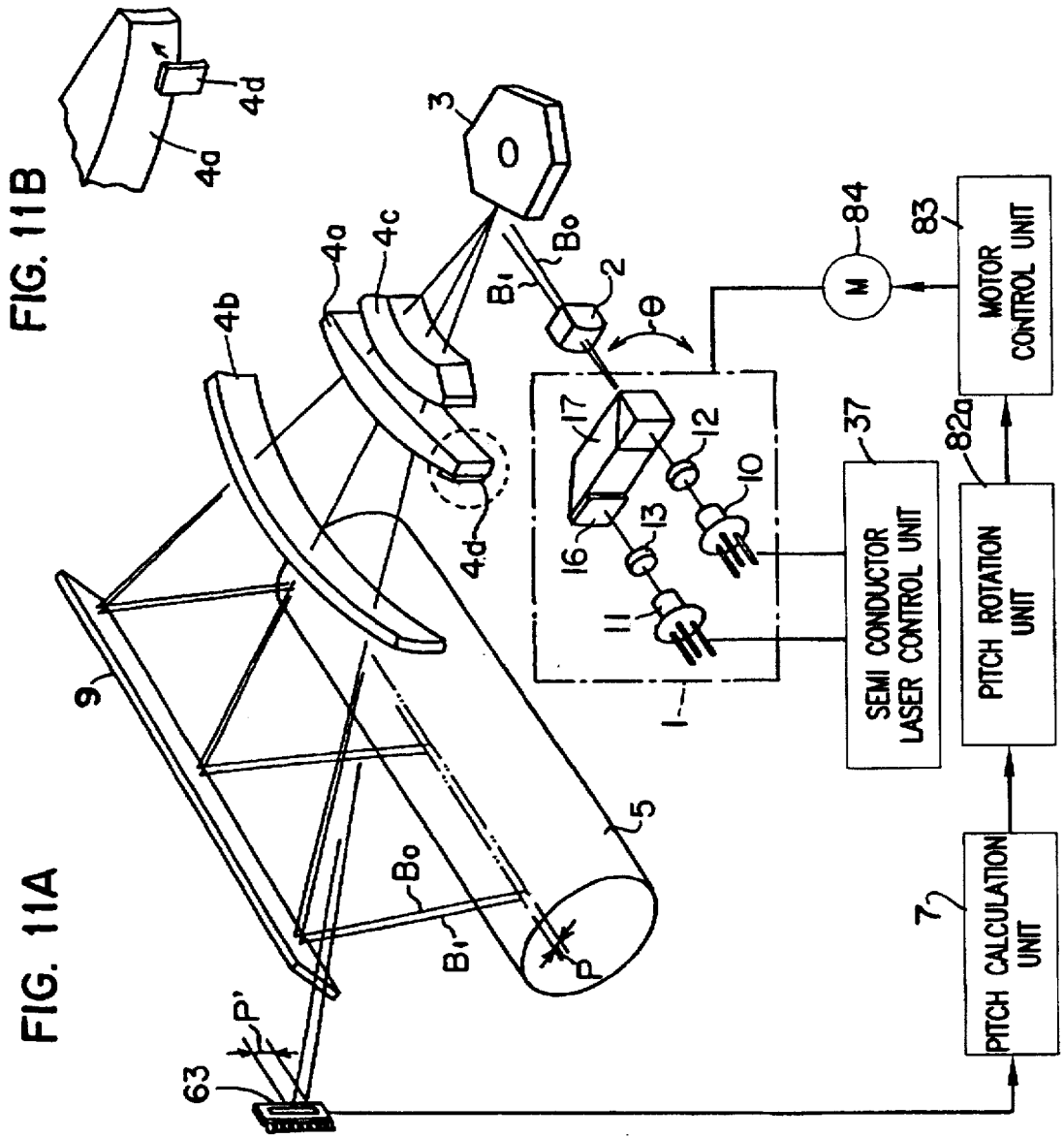
FIGS. 11A and 11B illustrate a second embodiment of the multi-beam pitch adjustment system which magnifies the pitch for measurements.

Referring to FIG. 11A, a second embodiment of the multi-beam pitch adjustment system according to the current invention includes an additional lens 4d, which causes the sub-scanning pitch to magnify on a photo sensor 63, located near a photo receptor drum 5. Other units in the second embodiment of the multi-beam pitch adjustment system operate in the substantially identical manner and are referred by the same reference numbers as in the first embodiment. However, unlike the first embodiment, the location of the photo sensor 63 is not limited to a position on the surface of the photo receptor drum 5 and is flexibly determined. However, the photo sensor 63 is located to detect the beams which have exited optical lenses 4a–4c as well as 4d. The lenses 4a and 4c are also known as fθ lenses while the lens 4b is a long troidal lens. On the surface of the fθ lens 4a, the additional lens 4d is placed near one edge to reduce the positive refractive power of a portion of the lens 4a as shown in an enlarged view in FIG. 11B. As a result, the beams passing through the above portion of the lens 4a and the lens 4d are magnified in the sub-scanning direction. Thus, the sub-scanning pitch detected by the photo sensor 63 is enlarged by a known magnification factor, and the enlarged sub-scanning pitch contributes to more accurate measurements. To determine a true sub-scanning pitch, the measured sub-scanning pitch is divided by the magnification factor. In order to adjust or maintain the sub-scanning pitch, the second embodiment operates in the substantially identical manner with the first embodiment except for the above-described additional components and process.

Figure 12:
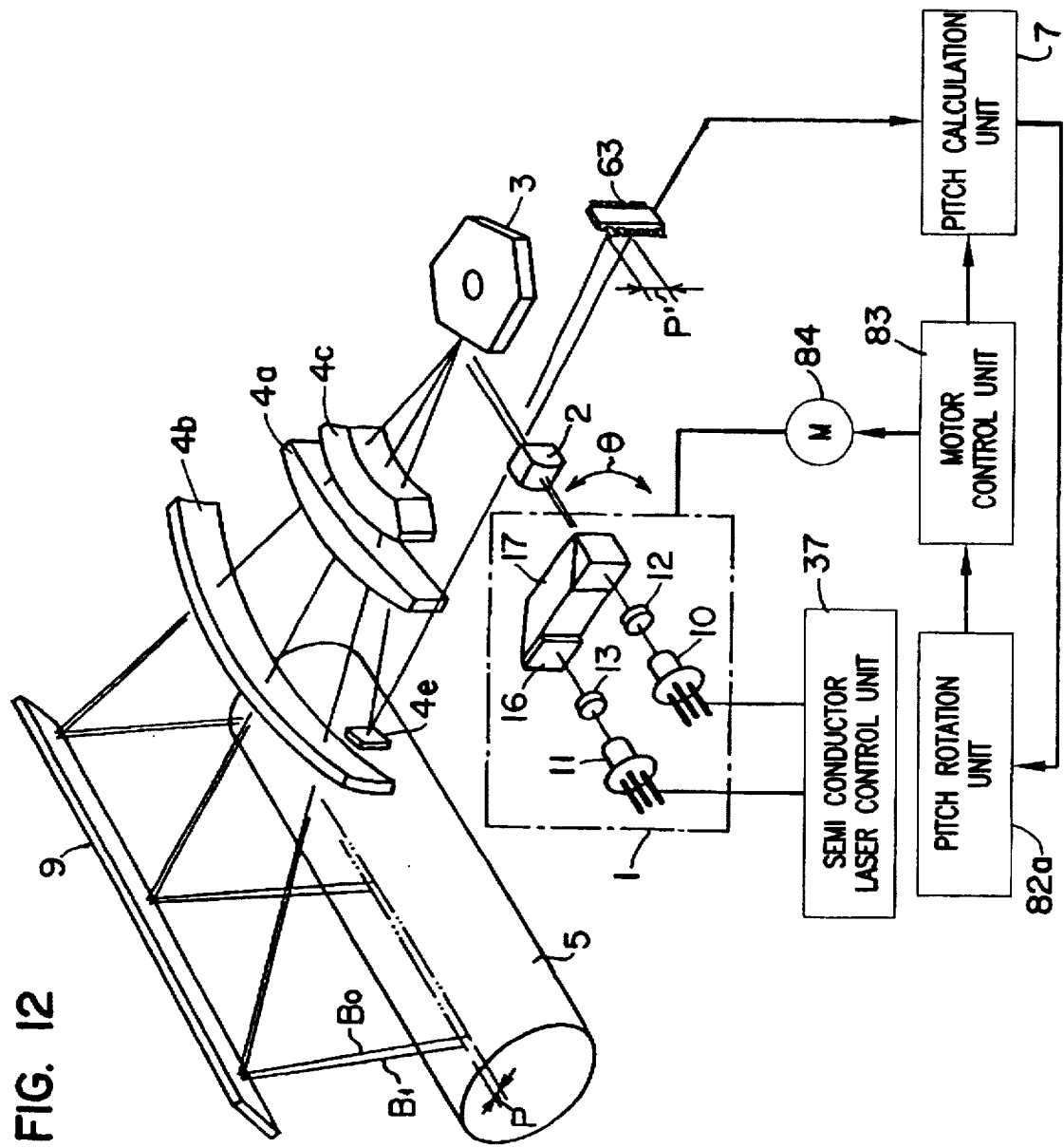
FIG. 12 illustrates a third embodiment of the multi-beam pitch adjustment system which directs the beams towards a flexibly located measuring unit.

Referring to FIG. 12, a third embodiment of the multi-beam pitch adjustment system according to the current invention includes a reflective surface or a mirror 4e placed on the surface of a troidal lens 4b for directing the beams that have exited two fθ lenses 4a and 4c towards a photo sensor 63. The mirror 4e allows the photo sensor 63 to be located at a relatively unrestricted position. In fact, since the mirror 4e is placed near one end of the troidal lens 4b at an angle to direct the beams backwards while avoiding the fθ lenses 4a and 4c as well as a polygon mirror 3, the photo sensor 63 is located near the fθ lenses 4a and 4c or the polygon mirror 3. As an alternative embodiment, a concave cylindrical mirror having a positive power in the sub-scanning direction is used in lieu of the flat surface mirror 4e. In general, other units in the third or its alternative embodiments of the multi-beam pitch adjustment system operate in the substantially identical manner and are referred by the same reference numbers as in the first embodiment.

Figure 13:
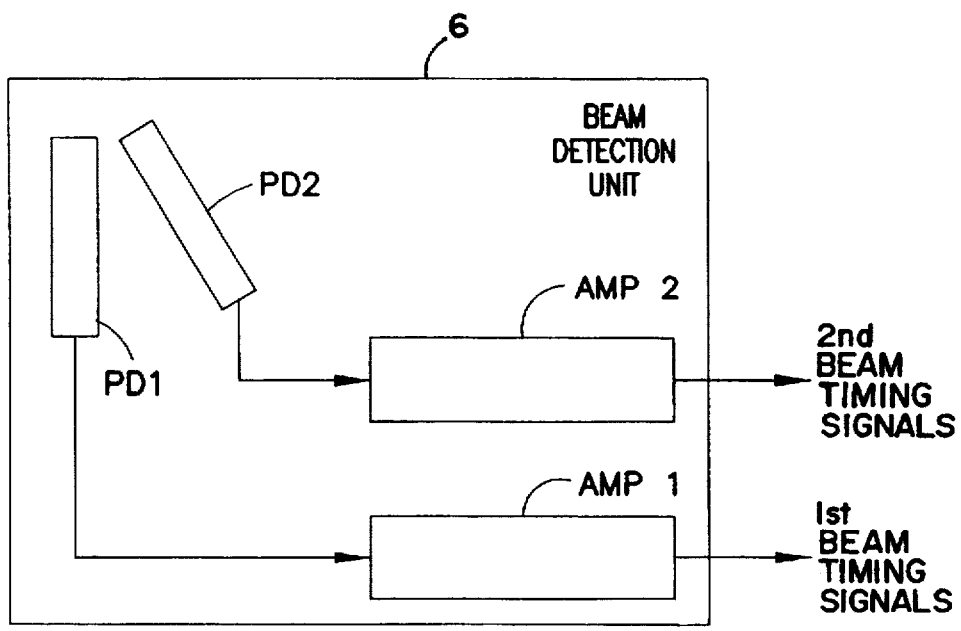
FIG. 13 illustrates a fourth embodiment of the multi-beam pitch adjustment system including a pair of photo sensors for measuring a pitch.

Now referring to FIG. 13, a fourth embodiment of the photo sensor and the associated measurement process according to the current invention includes a beam measurement unit 6. In lieu of a single photo sensor, the beam measurement unit 6 includes a pair of elongated photo diodes or light sensitive strips PD1 and PD2, both of which are located near a photo receptor drum 5 as well as a corresponding pair of amplifiers AMP1 and AMP2. The photo sensors PD1 and PD2 independently detect the beam, and the amplifiers AMP1 and AMP2 also independently amplify corresponding 1st and 2nd beam timing or detection signals. The pair of photo diodes PD1 and PD2 are located at a predetermined angle with each other for detecting a time difference of each beam's arrival.

Figure 14:
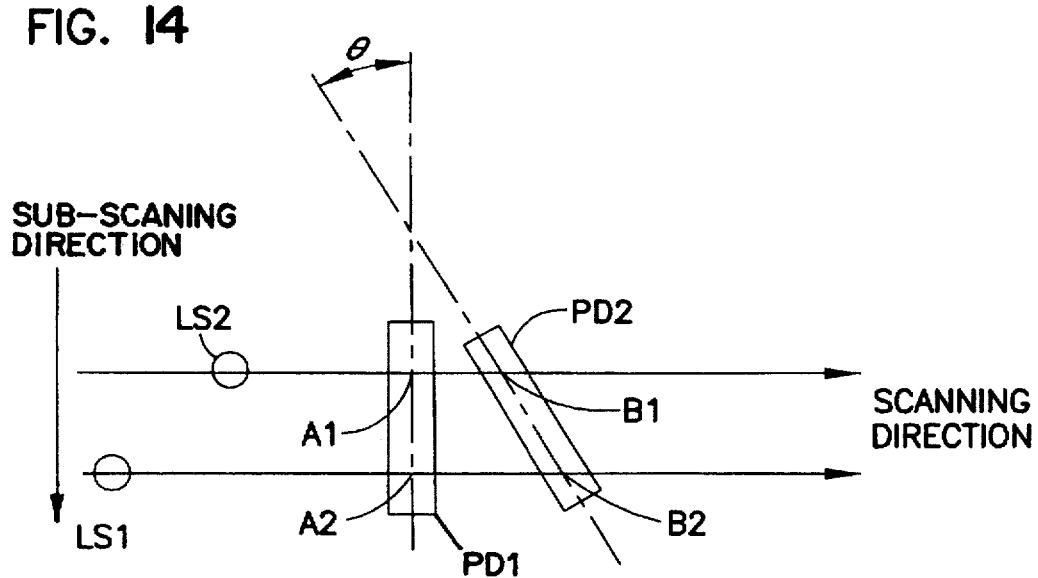
FIG. 14 illustrates one example of the relative location of the pair of photo sensors of the multi-beam pitch adjustment system.

In order to describe a more precise relative position of the photo sensors PD1 and PD2, referring to FIG. 14, the beams are simultaneously scanned so that they travel in the scanning or horizontal direction as indicated by a pair of horizontal arrows during a sub-scanning pitch measuring mode. The upper beam path is generated by scanning a laser spot LS2 while the lower beam path is generated by scanning a laser spot LS1. With respect to these scanning paths, the first photo sensor PD1 is positioned perpendicular to each of the scanning paths. In other words, the first sensor PD1 is placed in a sub-scanning direction or at zero degree with respect to the sub-scanning direction. In contrast, the second photo sensor PD2 is positioned at a predetermined angle θ with respect to the first photo sensor PD1. As the beams are scanned, the first photo sensor PD1 detects an arrival of the upper beam at a position A1 and that of the lower beam at a position A2 on the photo sensor PD1. The first photo sensor PD1 generates a pair of 1st timing signals corresponding to the arrival of the beams at the positions A1 and A2. Similarly, as the same beams are further scanned, the second photo sensor PD2 detects an arrival of the upper beam at a position B1 and that of the lower beam at a position B2 on the photo sensor PD2. The second photo sensor PD2 generates a pair of 2nd timing signals corresponding to the arrival of the beams at the positions B1 and B2.

Figure 15:
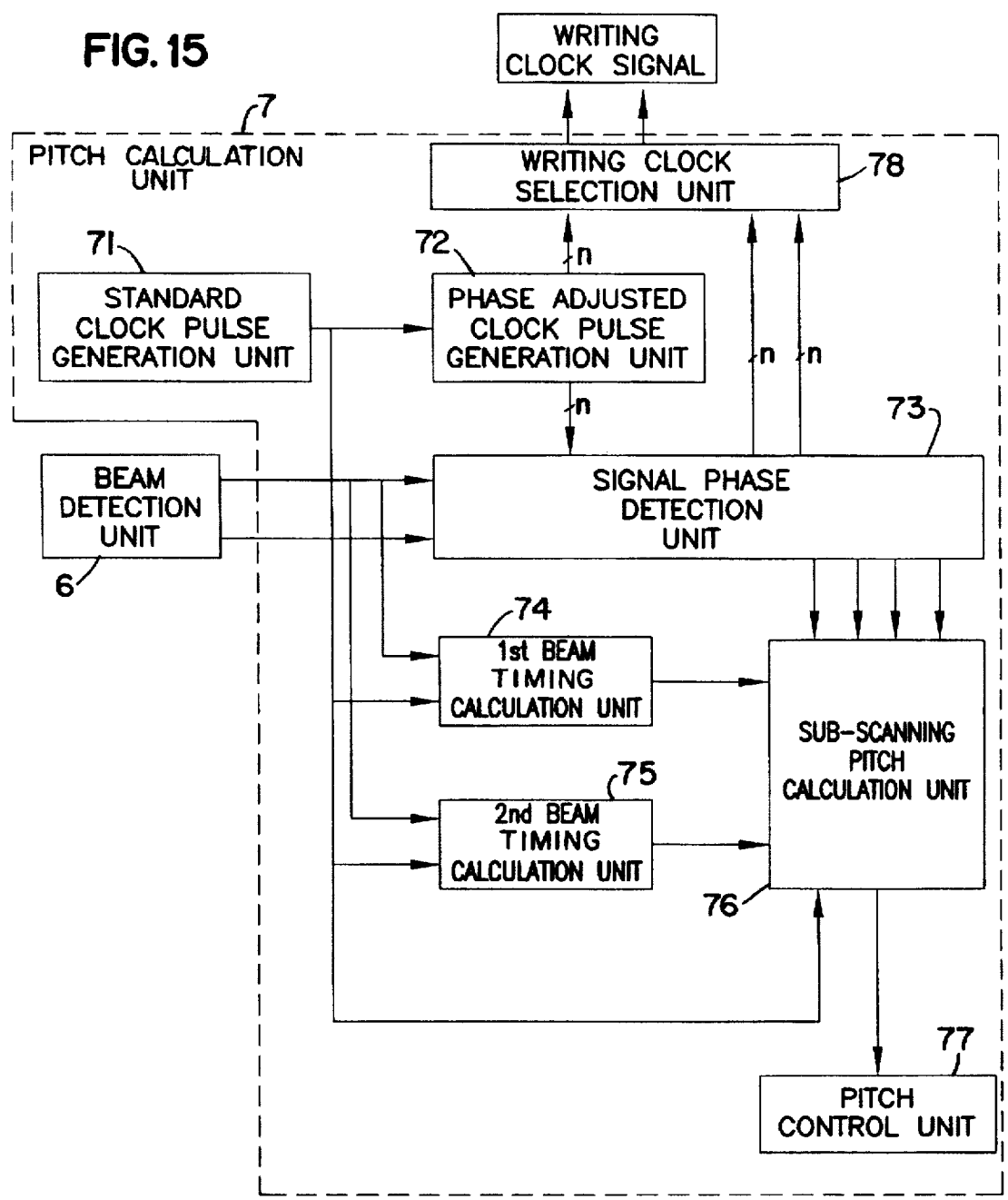
FIG. 15 illustrates a block diagram of a pitch calculation unit of the multi-beam pitch adjustment system.

Now referring to FIG. 15, in relation to the above-described embodiment of the beam detection unit 6, a second preferred embodiment of the pitch calculation unit according to the current invention is diagrammatically illustrated. Two pairs of 1st and 2nd beam timing signals are both sent to a signal phase detection unit 73, while each pair of the beam timing signals is respectively sent to a 1st beam timing calculation unit 74 and a 2nd beam timing calculation unit 75. In addition, the pitch calculation unit 7 includes a standard clock pulse generation unit 71 for generating standard clock pulses and a phase-adjusted clock pulse generation unit 72 for generating a series of clock pulses which are phase-adjusted from the standard clock pulse. The 1st beam timing calculation unit 74 receives the standard clock pulse and calculates an approximated amount of time difference between the two beams in arriving the first photo sensor PD1 using the standard clock pulse. The 1st timing calculation unit 74 generates a first time differential signal indicative of a horizontal distance or a scanning pitch between the two beams at the first photo sensor PD1.

Similarly, the 2nd timing calculation unit 75 also receives the standard clock pulse and calculates an approximated amount of time difference between the two beams in arriving at the second photo sensor PD2 using the standard clock pulse. The 2nd timing calculation unit 75 generates a second timing signal indicative of a horizontal distance or a scanning pitch between the two beams at the second photo sensor PD2.

Still referring to FIG. 15, upon receiving the 1st and 2nd timing signals, the signal phase detection unit 73 matches the closest phase-adjusted clock pulses to better approximate the arrival timing of each beam at each photo sensor and generate a set of four corresponding approximated timing signals. The signal phase detection unit 73 and the 1st and 2nd timing calculation units 74 and 75 all output the above-described generated signals to a sub-scanning pitch calculation unit 76, and the sub-scanning pitch calculation unit 76 determines a sub-scanning pitch distance based upon the above inputs as well as the angle θ of the second photo sensor. The sub-scanning pitch calculation unit 76 generates a sub-scanning pitch signal and outputs it to a pitch control unit 77. A writing clock selection unit 78 selects a writing timing signal based upon the phase-adjusted clock pulses from the phase-adjusted clock pulse generation unit 72 as well as the approximated timing signals from the signal phase detection unit 73. The selected writing timing signals allow each beam to initiate writing at an accurate onset position in the scanning direction.

Figure 16:
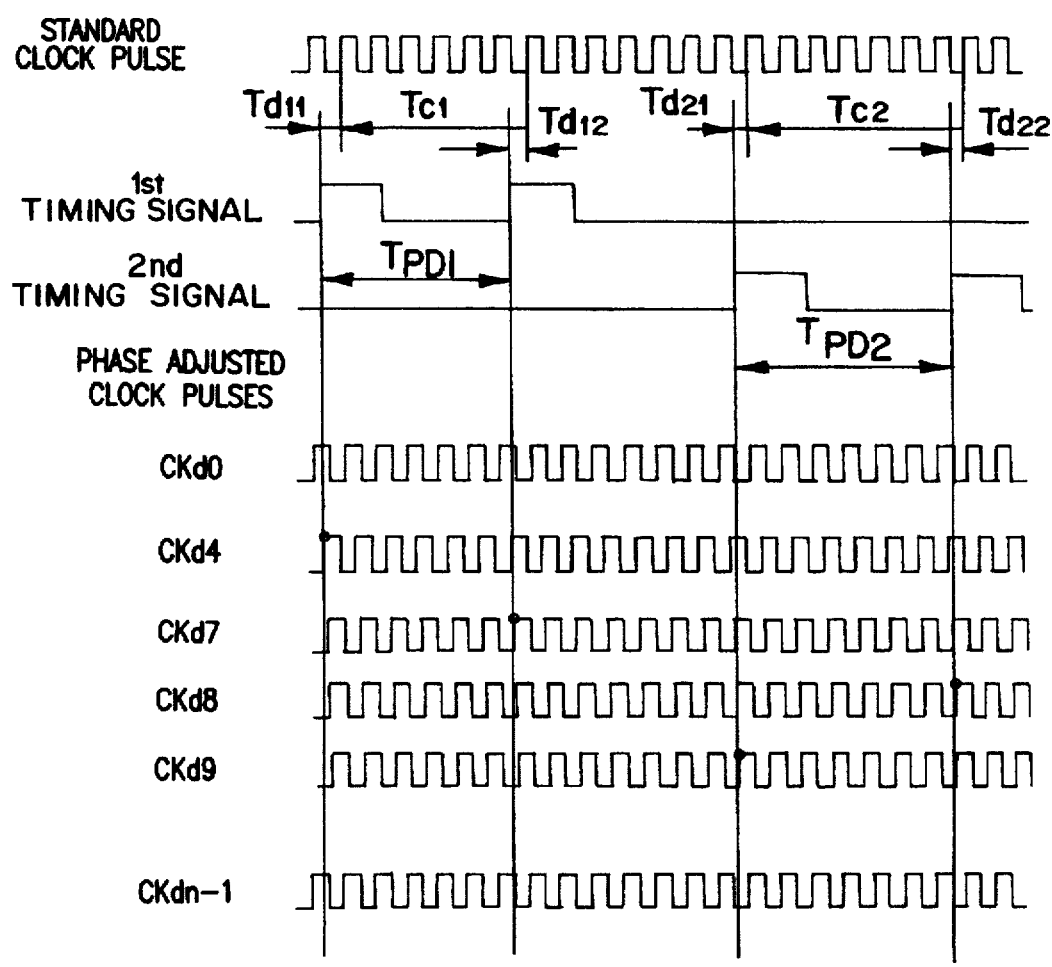
FIG. 16 is a timing diagram for the pitch calculation unit of the multi-beam pitch adjustment system.

Now referring to FIG. 16, a timing diagram provides one example of how the above-described components determine the sub-scanning pitch based upon the timing signals detected by the two photo sensors which are positioned at a known angle θ with each other. The first timing signal detected by the first photo sensor is approximated by the standard clock signal, and the approximated amount of time difference between the two beams in arriving at the first photo sensor is now indicated by $T_{C1}$. By the same token, the second timing signal detected by the second photo sensor is approximated by the standard clock signal, and the approximated amount of time difference between the two beams in arriving at the second photo sensor is now indicated by $T_{C2}$. However, since these time periods are approximated by the standard clock pulse of a predetermined cycle, the time is better approximated by using a series of phase-adjusted clock pulses which are generated by phase-adjusting the standard clock pulses. Some of a series of the phase-adjusted clock pulses are shown as CKd0 through CKd9 and CKdn-1. To better approximate the time periods, the onset of each timing signals is now best matched with those of the phase-adjusted clock pulse signals. The first onset of the first timing signal is matched with the onset of CKd4 while the second onset of the same signal is matched with that of CKd7. Similarly, the first onset of the second timing signal is matched with the onset of CKd9 while the second onset of the same signal is matched with that of CKd8. These phase-adjusted signals thus lead to correctional time amounts $T_{d11}$, $T_{d12}$, $T_{d21}$ and $T_{d22}$, and by adding or subtracting these correctional time amounts to the already obtained time amount, better approximated time differences $T_{PD1}$ and $T_{PD2}$ are now obtained.

After obtaining the above-described time information, the following equations are used to determine the sub-scanning pitch.

$$PV = TH \cdot V \cdot \tan\theta \tag{1}$$

where PV is a sub-scanning pitch, TH is a time differential, and V is a scanning velocity in the scanning direction.

$$TH = T_{PD2} - T_{PD1} \tag{2}$$

where TH is a difference in time. Each term of the equation (2) is expressed as follows as better approximated:

$$T_{PD2} = T_{C2} + T_{d21} - T_{d22} \tag{3}$$

$$T_{PD1} = T_{C1} + T_{d11} - T_{d12} \tag{4}$$

Substituting the above equations (3) and (4) back into the equation (2), and subsequently into the equation (1), the following equation (5) is obtained.

$$PV = \{(T_{C2} + T_{d21} - T_{d22}) - (T_{C1} + T_{d11} - T_{d12})\} \cdot V \cdot \tan\theta \tag{5}$$

Since PV=TV·V, the equation (5) becomes as the following equation (6):

$$TV = \{(T_{C2} + T_{d21} - T_{d22}) - (T_{C1} + T_{d11} - T_{d12})\} \cdot \tan\theta \tag{6}$$

Finally, since the sub-scanning pitch depends on the recording density, the sub-scanning pitch PV takes additional considerations as expressed in the following equation (7).

$$PV = (25.4) \cdot f \cdot TV/D \tag{7}$$

where f is a frequency of a standard clock in Hz, D is a recording density in dpi, and 24.5 is an empirical coefficient.

Figure 17:
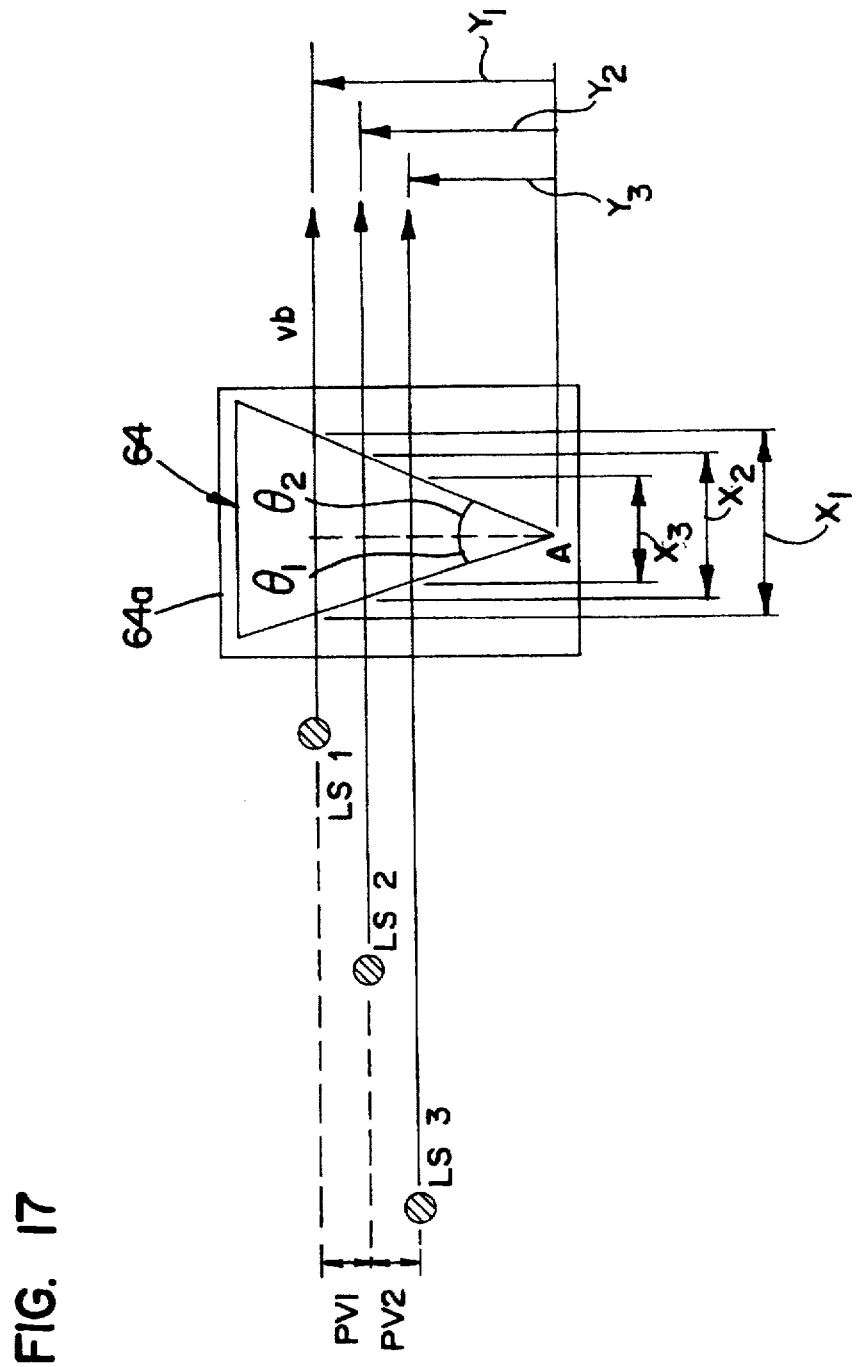
FIG. 17 is a fifth embodiment of the multi-beam pitch adjustment system.

Now referring to FIG. 17, a fifth embodiment of the multi-beam pitch adjustment system according to the current invention includes a single photo sensor 64 having a shape with at least three edges and including a plurality of photo sensitive elements such as photo diodes. For example, the shape of the photo sensor 64 is either triangular or trapezoidal. In the fifth embodiment, two edges of the triangular photo sensor 64 are respectively located at a predetermined angle $\theta_1$ and $\theta_2$ with respect to the sub-scanning direction of the beams so that three beams LS1, LS2 and LS3 each travel a correspondingly different distance $x_1$, $x_2$ and $x_3$ over the photo sensor 64. In addition, a distance to each of the three beams LS1, LS2 and LS3 from a vertex A is respectively designated by $y_1$, $y_2$ and $y_3$. Since the three beams LS1, LS2 and LS3 are scanned in the parallel direction at the same velocity vb, an amount of time for each beam to travel over the photo sensor 64 differs.

Still referring to FIG. 17, [sing] the above-described dimensions of the photo sensor 64, the relationships among these dimensions are expressed as follows:

$$y_1 = x_1/(\tan\theta_1 + \tan\theta_2) \tag{8}$$

$$y_2 = x_2/(\tan\theta_1 + \tan\theta_2) \tag{9}$$

$$y_3 = x_3/(\tan\theta_1 + \tan\theta_2) \tag{10}$$

Furthermore, based upon the above equations (8)–(10), a sub-scanning pitch PV1 between the beams LS1 and LS2 and a sub-scanning pitch PV2 between the beams LS2 and LS3 are respectively expressed as follows:

$$PV1 = y_1 - y_2 = (x_1 - x_2)/(\tan\theta_1 + \tan\theta_2) \tag{11}$$

$$PV2 = y_2 - y_3 = (x_2 - x_3)/(\tan\theta_1 + \tan\theta_2) \tag{12}$$

By measuring the different amount of time t1, t2 and t3 for the three beams LS1, LS2 and LS3 to respectively travel the distance $x_1$, $x_2$ and $X_3$ at the velocity vb, and based upon the above equations (11) and (12), the sub-scanning pitches PV1 and PV2 are respectively expressed in terms of time as follows:

$$PV1 = (t1 - t2) \cdot vb/(\tan\theta_1 + \tan\theta_2) \tag{13}$$

$$PV2=(t2-t3)\cdot vb/(\tan\theta_1+\tan\theta_2) \quad (14)$$

where the scanning beam velocity vb in meters per second is determined by the following equation:

$$vb=F\cdot\theta_{pl}\cdot v\cdot RD/nb/24.5 \quad (15)$$

where F is a focal distance in mm of a fθ lens, $\theta_{pl}$ is a maximal scanning angle of each mirror surface (4π/a number of mirror surfaces), v is a velocity in m/s of an intermediate image-forming surface which moves by its rotation in a sub-scanning direction, RD is a recording density in dpi, nb is a number of beams to be simultaneously scanned and 24.5 is an empirically determined coefficient.

Figure 18:
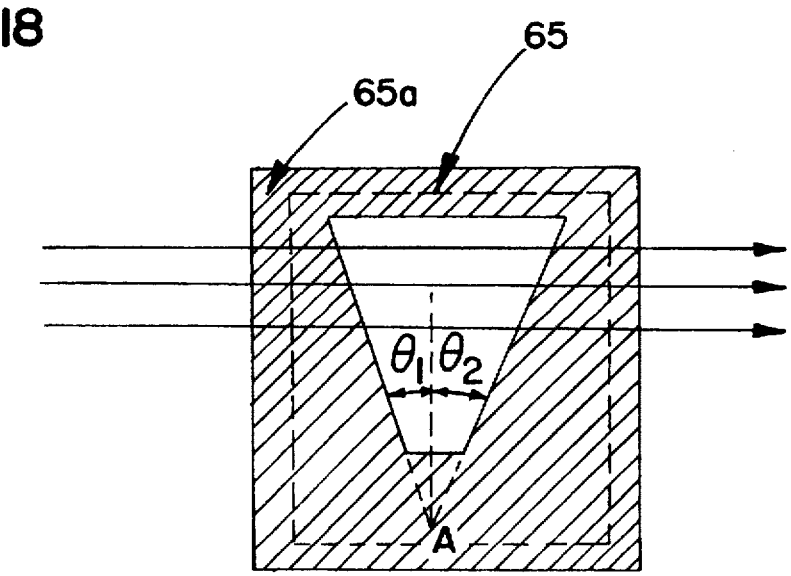
FIG. 18 diagrammatically illustrates an alternative fifth embodiment of the multi-beam pitch adjustment system.

As a variation of the above-described photo sensor 64, referring to FIG. 18, in lieu of the triangular or trapezoidal shaped photo sensor 64, a rectangular shaped photo sensor 65 is used along with an opaque cover 65a with a trapezoidal opening so that the beams reach the photo sensor 65 only in the trapezoidal area. Similarly, another opaque cover with a triangular opening may be used. In using either of the opaque covers, the opaque cover 65a is placed in the above-described orientation with respect to the scanning direction of parallel beams which are indicated by arrows. Specifically, one edge of the exposed area on the photo sensor 65 is orientated at an angle $\theta_1$ with respect to the sub-scanning direction while the other edge at an angle $\theta_2$ with respect to the sub-scanning direction.

Figure 19:
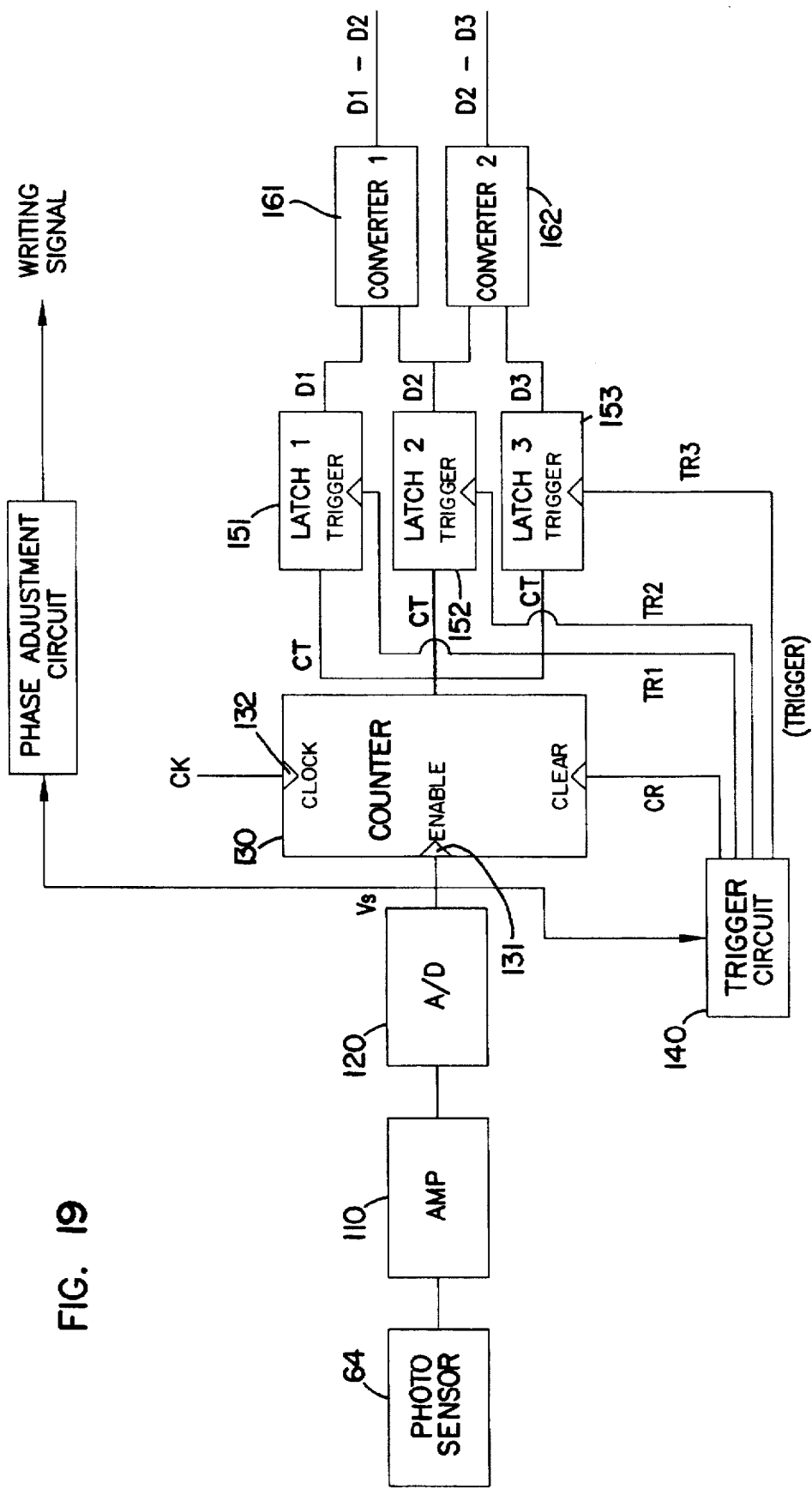
FIG. 19 is a partial circuit diagram of the fifth embodiment of the multi-beam pitch adjustment system.

Now referring to FIG. 19, a block diagram of the components illustrates as to how signals from the photo sensor 64 are processed to determine a time for each beam to travel a distance between the edges of the photo sensor 64 in the scanning direction. Although one example of the preferred embodiment of the pitch calculation unit according to the current invention accommodates three scanning beams, the number of the scanning beams is not limited to three to practice current invention. The detected signal is amplified by an amplifier 110 and then converted to a digital signal Vs by an analog-to-digital converter (A/D) 120. The Vs signal enables a counter 130, which receives a standard clock signal CK 132. The counter 130 counts a number of the standard clock signals 132 and continuously generates a updated count signal CT indicative of the counted number of the clock signals 132. While the above counting process is performed, a trigger circuit 140 also receives the digital signal Vs signal and detects falling edges of the detected digital signal Vs for generating a set of trigger signals. The trigger circuit triggers a first trigger signal TR1 upon detecting a first falling edge of the Vs signal for triggering a first latch 151 to latch the number of counts CT in the first latch 151, a second trigger signal TR2 upon detecting a second falling edge for triggering a second latch 152 to latch the number of counts CT in the second latch 152, and a third trigger signal TR3 upon detecting a third falling edge for triggering a third latch 153 to latch the number of counts CT in the third latch 153. The trigger circuit also triggers a clear signal CR after a certain delay to initialize the counter upon detecting each occurrence of the falling edge in the Vs signal. Lastly, comparators 161 and 162 respectively determine differences in the counts stored in the latches Di and D2 as well as D2 and D3. The differences indicate time differences for the beams to travel different distances between the edges.

Figure 20:
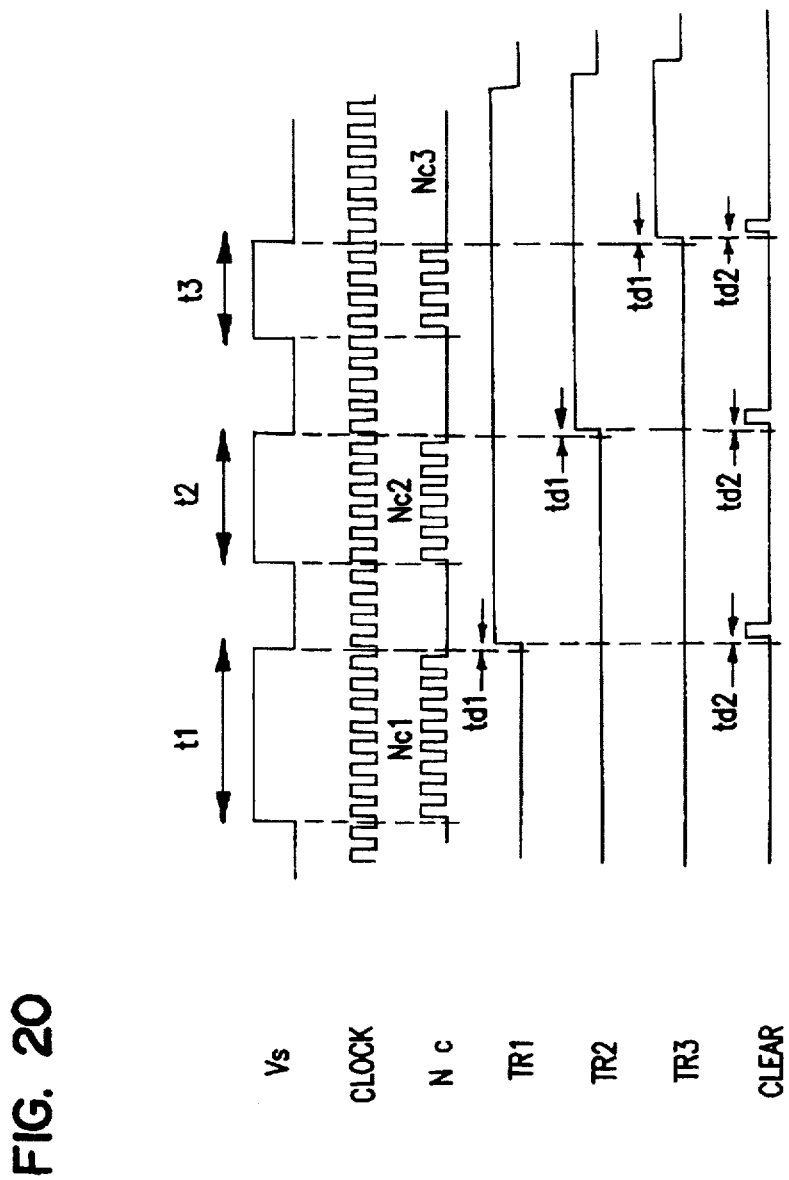
FIG. 20 is a timing diagram of the pitch calculation unit of the fifth embodiment of the multi-beam pitch adjustment system.

Referring to FIGS. 19 and 20, a timing diagram more precisely illustrates operational timing of the above-described components. As described above, the Vs signal represents digitally-converted detected signals that originated from the photo sensor 64. Durations or times t1, t2 and t3 respectively indicate an amount of time for each beam to scan a corresponding distance between the two edges on a photo sensor 64. A CLOCK signal represents the above-described standard clock signal to the counter 132. Nc1, Nc2 and Nc3 respectively indicate a number of counts stored in latches 151, 152 and 153. TR1, TR2 and TR3 respectively represent trigger signals, and each of the trigger signals TR1, TR2 and TR3 is generated with a first predetermined delay td1 after detecting the falling edge of the Vs signal. Furthermore, a CLEAR signal is generated with a second predetermined delay td2 after the trigger signal TR1, TR2 and TR3, and the CLEAR signal initializes the counter 130 to zero. The above-determined times t1, t2 and t3 are ultimately used in equations (13) and (14) in order to calculate a sub-scanning pitch distance between the beams.

Figure 21:
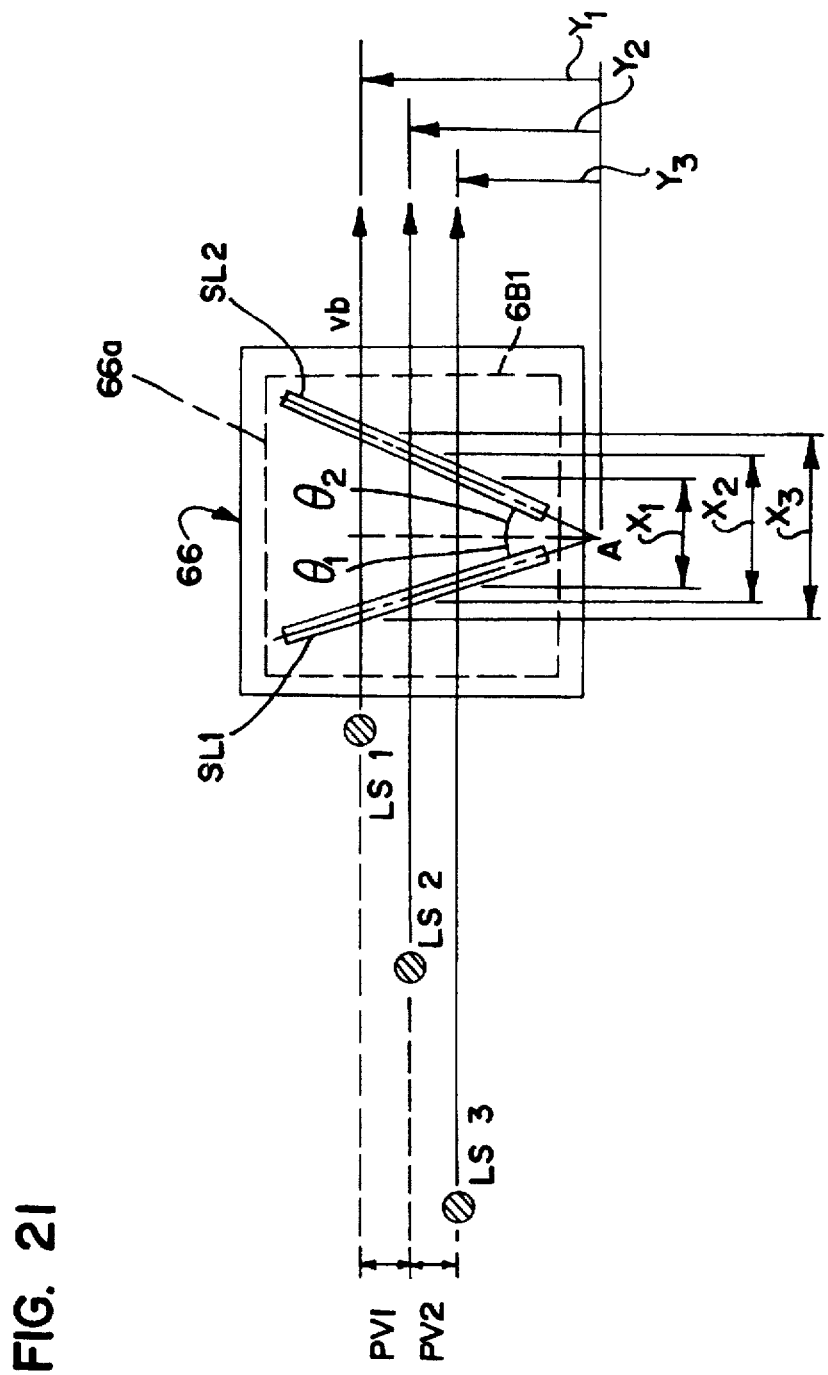
FIG. 21 illustrates another alternative fifth embodiment of the multi-beam pitch adjustment system.

Referring to FIG. 21, an alternative embodiment of the photo sensor according to the current invention is illustrated. An opaque cover 66 placed over the photo sensor 66a,and the opaque cover 66 has two slits, SL1 and SL2 to allow the beams LS1, LS2 and LS3 to reach the photo sensor 66a. The slits SL1 and SL2 are respectively orientated at a predetermined angle $\theta_1$ and $\theta_2$ with respect to the sub-scanning direction indicated by a dotted line. Using this alternative photo sensor 66a and the cover 66, as described above with reference to FIGS. 13–16, the time differential between the beams in arriving at the photo sensor is used in the equations (1) through (7) to determine a sub-scanning pitch between the beams.

Figure 22A:
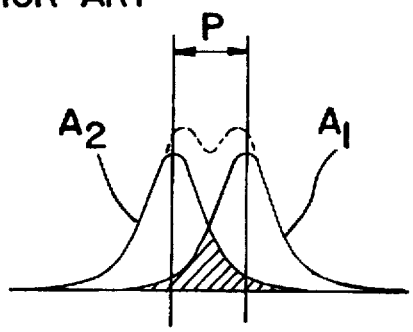
FIGS. 22A and 22B respectively illustrate distinct beam measurements and indistinguishable beam measurements.
Figure 22B:
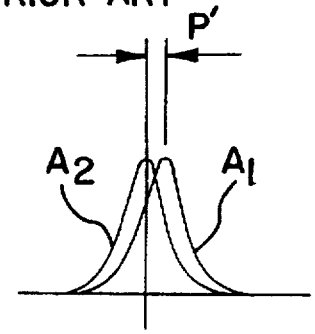

In the above-described embodiments of the multi-beam adjustment process and system according to the current invention, to simultaneously scan multiple beams during the sub-scanning pitch measurements, a sufficient pitch or horizontal distance between the beams allows a photo sensor to measure accurate positions with minimal interference between the beams. As shown in FIG. 22A, the two output signals A1 and A2 are sufficiently distinct with each other when the two beams are scanned with a horizontal pitch of P. On the other hand, when the scanning pitch or horizontal distance P' is not sufficient during the sub-scanning pitch measurements, the interference between the beams is significant, and the output signals A1 and A2 are now hardly distinguishable as shown in FIG. 22B.

Figure 23A:
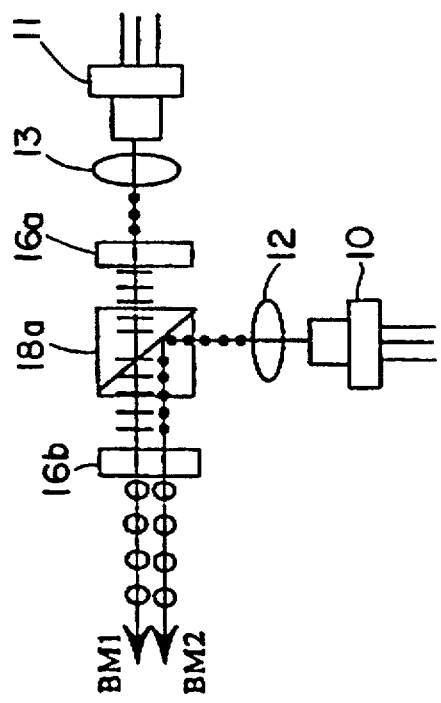
FIGS. 23A and 23B diagrammatically illustrate a light emitting side and a light measuring side of a sixth embodiment of the multi-beam pitch adjustment system.
Figure 23B:
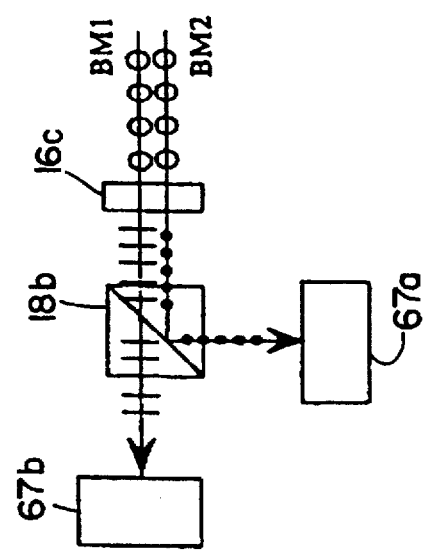

In order to maximize the accuracy in the above-described sub-scanning measurements, referring to FIGS. 23A and 23B, one preferred embodiment of the multi-beam pitch adjustment system according to the current invention includes two light sources 10 and 11 that respectively emit light towards collimator lenses 12 and 13. A first beam originated in the light source 10 enters the beam splitter 18a without being polarized while a second beam originated from the light source 11 enters into a beam splitter 18a after being polarized by a wave plate 16a. The second polarized beam exits the beam splitter 18a without changing its direction. The first beam, on the other hand, is reflected by the beam splitter 18a. The two beams after exiting the beam splitter 18a, now enter another wave plate 16b together to form closely adjacent beams BM1 and BM2.

Now referring to FIG. 23B, the closely aligned beams BM1 and BM2 enter into a second beam splitter 18b after exiting a third wave plate 16c. The beam splitter 18b allows the beam BM1 to pass directly toward a second photo sensor 67b while it directs the beam BM2 toward a first photo sensor 67a which is separate and flexibly located with respect to the second sensor 67b. Because of these separate photo sensors, the closely adjacent beams BM1 and BM2 do not interfere with each other during the sub-scanning pitch determination process.

Figure 24:
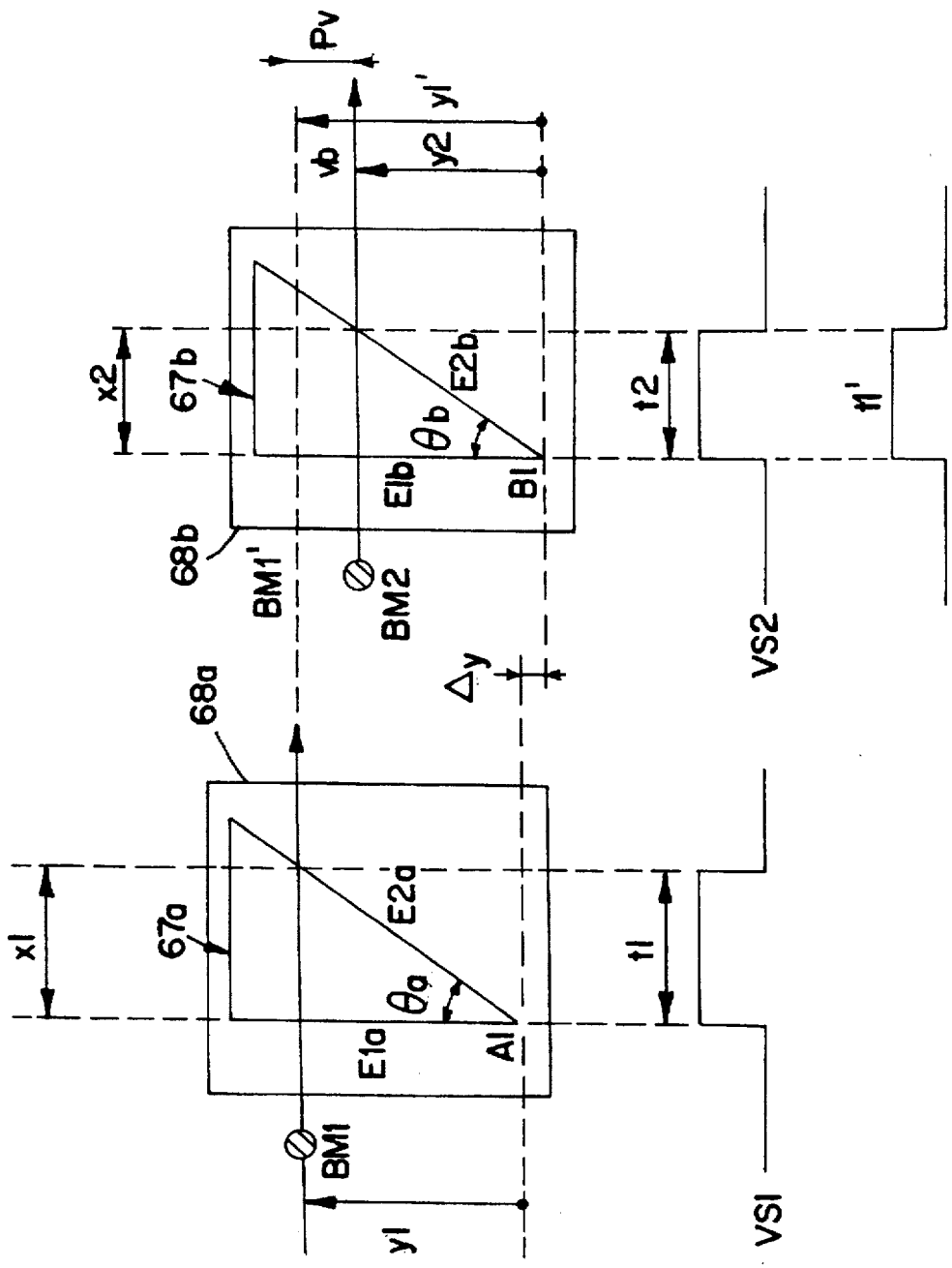
FIG. 24 diagrammatically illustrates how the sixth embodiment measures a sub-scanning pitch between the beams.

The detailed description on the sub-scanning pitch measurement using the above-described separate photo sensors 67a and 67b is provided in reference to FIG. 24. The first photo sensor 67a is triangular and located on a first holder 68a. An edge E1a sharing a vertex A1 is substantially perpendicular to a scanning direction of the beam BM1 while an edge E2a is positioned at an angle $\theta_a$ with respect to the edge E1a. A second photo sensor 67b located on a second holder 67b is also triangular and substantially identical to the first photo sensor 67a. An edge E1b sharing a vertex B1 is substantially perpendicular to a scanning direction of the beam BM2 while an edge E2b is positioned at an angle $\theta_b$ with respect to the edge E1b. As already described, only the beam BM1 scans on the photo sensor 67a, and only the beam BM2 scans on the photo sensor 67b. A time t1 indicates an amount of time for the beam BM1 to travel a distance x1 on the first photo sensor 67a. Similarly, a time t2 indicates an amount of time for the beam BM2 to travel a distance x2 on the second photo sensor 67b. When the two photo sensors 67a and 67b are not placed at a perfectly parallel position with each other, a positional difference as indicated by Δy in the sub-scanning direction is taken into the following equation to determine a sub-scanning pitch PV:

$$PV = (t2-t1) \cdot vb/(\tan \theta_a + \tan \theta_{b(\_)}) + \Delta y \qquad (16)$$

where Δy is defined as follows if not directly measured:

$$\Delta y = \Delta t \cdot vb/(\tan \theta_a + \tan \theta_{b(\_)}) \qquad (17)$$

and Δt=t1'−t1 where t1' corresponds to a time measured for the beam BM1 to travel on the second photo sensor 67b as indicated by a dotted line BM1'. In order for the beam BM1 to reach the second photo sensor 67b, either of the wave plates 16a and 16c as shown in FIGS. 23A and 23B is removed so that the beam BM1 is prevented from being directed by the beam splitter 18b towards the first photo sensor 67a.

After a current sub-scanning pitch is measured using one of the above-described embodiments and processes, a correction distance or angle is determined to adjust the sub-scanning pitch substantially close to a predetermined desired sub-scanning distance value according to the current invention by rotating the light source housing unit. In this final operation of the multi-beam pitch adjustment system, an amount of the adjustment must be sufficiently precise to achieve the predetermined desired sub-scanning pitch. The precise control is attempted in prior art using a contact switch.

Figure 25:
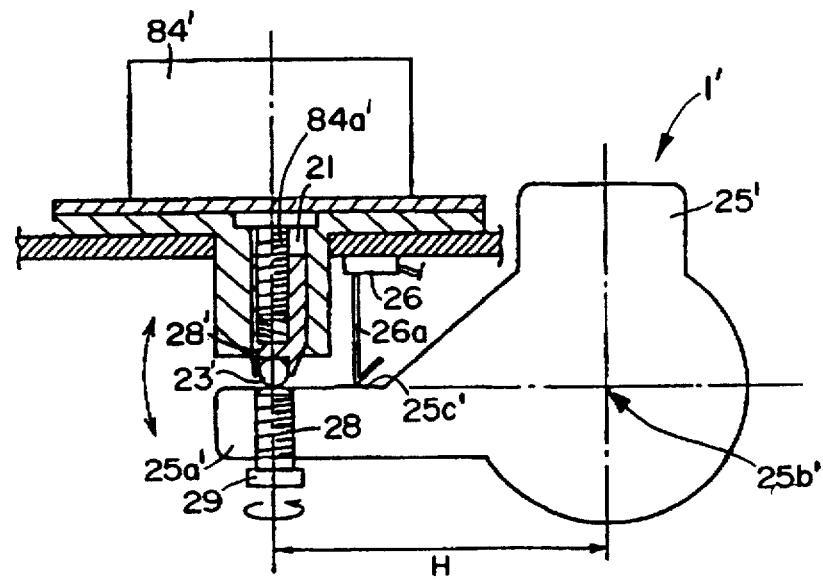
FIG. 25 is a cross-sectional view of a prior art rotational sub-system.

Referring to FIG. 25, a cross sectional view of a prior art device illustrates as to how a rotatable housing unit 1' is rotated by a stepping motor 84'. A guide 21' is provided for a motor shaft 84a' and a movable member 28', and the motor shaft 84a' and the movable member 28' are both threaded so as to be engaged with each other as a screw and a bolt. The movable member 28' vertically moves in the guide 21 as the motor shaft 84a' is rotated. The movable member 28' holds a rotatable ball 23' in place at its tip. A main plate 25' has an arm 25a' which opposes the movable member 28' and the ball 23' contacts an adjustment screw 29 placed in the arm 25a'. As the movable member 28' vertically moves, the rotatable housing unit of rotation 25b' of the main plate 25'. To precisely control the rotation of the rotatable unit 1' at an angle, the rotatable housing unit is positioned at a predetermined angle as shown in FIG. 25 at which a contact switch 26a contacts a contact plate 25c' placed on the arm 25a', and from this predetermined position, the rotatable unit 1' is rotated by activating the motor 84' based upon a number of predetermined signals. The above-described predetermined angular position is used to calibrate an initial position from which the angular position is tracked based upon the number of stepping motor signals. Because of the above physically contacting nature of the switch plates 26a and 25c', over a long term use, corrosion, dust, friction, etc impair correct function of the switch. In addition, the switch plates 26a and 25c' may be easily deformed, for example, due to over rotation. Lastly, the switch 26 allows the housing unit 1' to rotate only in one direction from the predetermined initial position.

Figure 26:
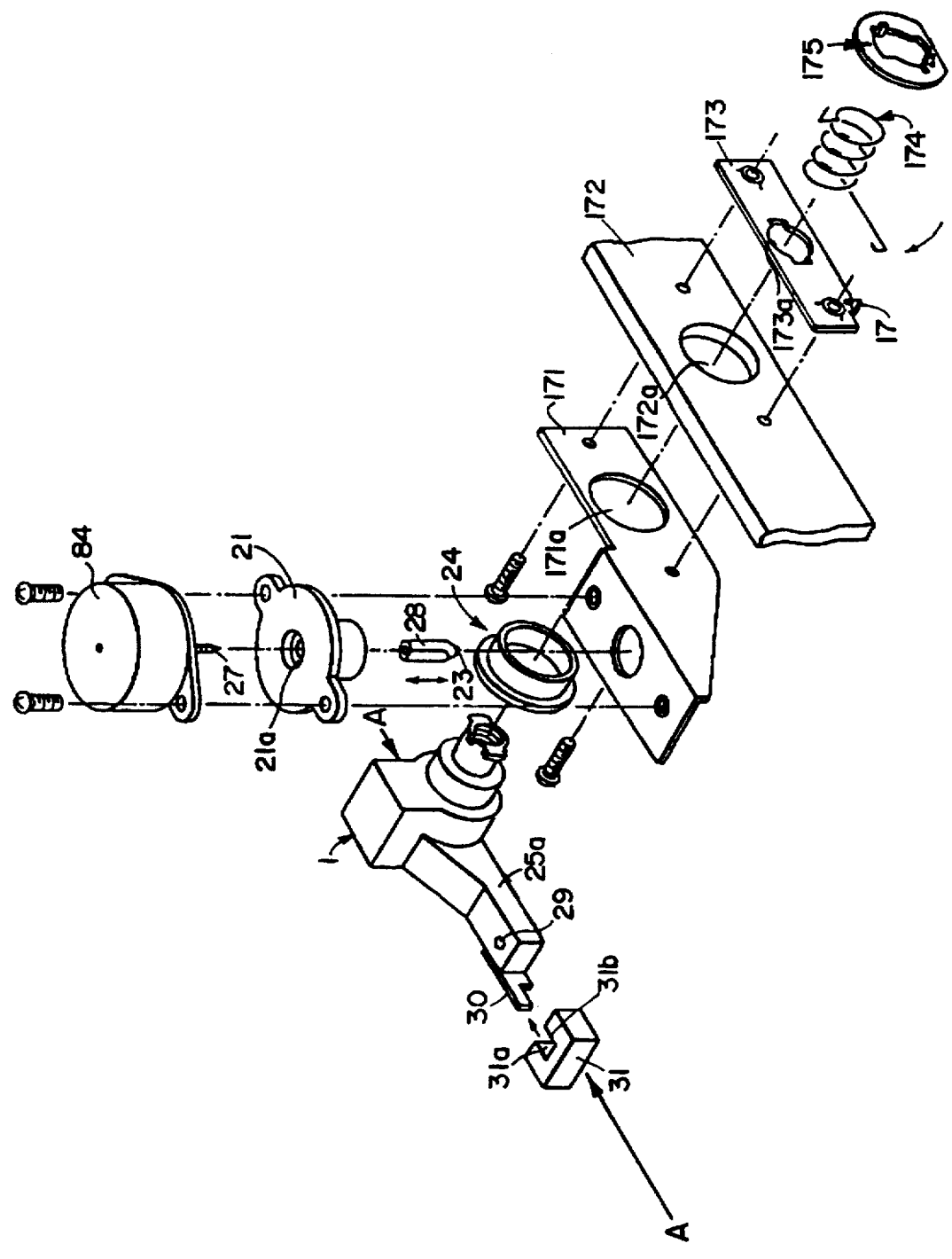
FIG. 26 is an expanded perspective view of one preferred embodiment of the multi-beam pitch adjustment system according to the current invention.

Now referring to FIG. 26, in order to solve the above and other problems, one preferred embodiment of the rotation sub-system according to the current invention includes a non-contacting switch. One example of the non-contacting switch includes an optical or photo sensor switch 31. The photo sensor switch 31 projects a beam from a wall 31a, and the beam is detected on a sensor mounted on an opposite wall 31b to close the switch. An opaque or light intransmissive projection 30 is mounted at a distal end of an arm portion 25a of a rotatable housing unit 1. The switch 31 is positioned within a rotational radius of the projection 30 so that as the projection 30 is moved to position between the walls 31a and 31b, the photo sensor switch 31 is open. As described already in reference to a prior art device, the arm 25a contacts a rotatable ball 23 held in place at a movable member 28, which is vertically driven by a threaded shaft of a stepping motor 84. The motor 84 is mounted on a motor mounting piece 21 and a mounting plate 171. The rotatable housing unit 1 is mounted on the mounting plate 171 via a ring 24 placed in a through hole 171, and the mounting bracket 171 is screwed to a board 172 via a fixing bracket 173. The rotatable unit 1 extends through bores 171a, 172a and 173a and is held in place by a holding plate 175 at a mounting position. The rotatable unit 1 is biased by a spring 174 in a counterclockwise direction as indicated by an arrow.

Figure 27:
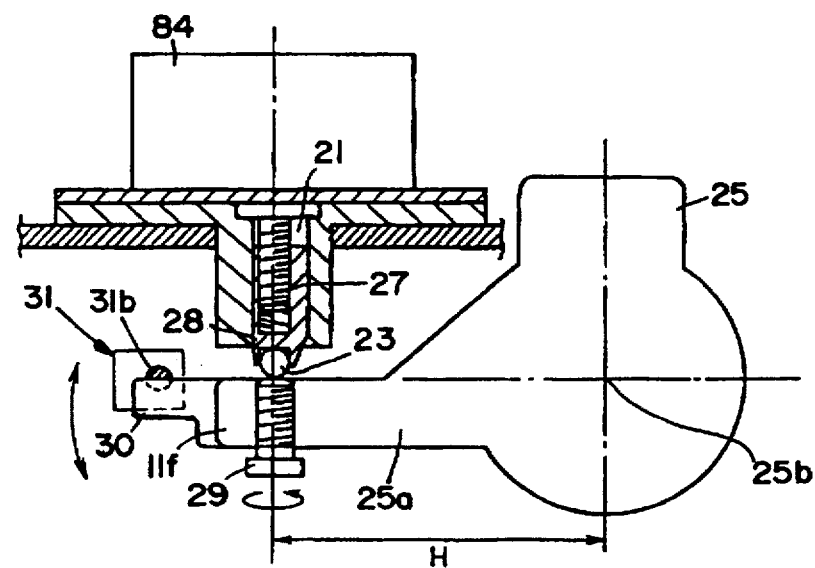
FIG. 27 is a cross-sectional view of the rotational sub-system taken at A—A of FIG. 26.

Now referring to FIG. 27, a cross sectional view of the above-described preferred embodiment is illustrated at a line A—A in FIG. 26. The position of the arm 25a is at an onset of opening the switch 31 as the projection 30 covers a light path of the beam towards an inner wall 31b. To rotate the arm 25a in relation to the photo switch 31, as described above, the rotation of the stepping motor 84 is converted to the vertical movement of a movable member 28 via a threaded motor shaft which engages the movable member 28. An angle of rotation Δθ of the arm 25a caused by the movement of the movable member 28 is expressed in the following equation.

$$\Delta \theta = \tan^{-1}(Ps/Sr \cdot H) \qquad (18)$$

where Ps is a pitch of the movable member 28, Sr is a number of pulses required for causing one rotation of the stepping motor 84, and H is a distance between the optical axis of the rotatable unit 25 and the point of contact on the arm 25a at the ball 23. For example, when Ps=0.35 mm, Sr=48, and H=30 mm; Δθ is approximately 0.014.

In further specifying components associated with rotation for the multi-beam pitch adjustment system according to the current invention, the following equation is helpful:

$$F \cdot H > Ts + Tb \qquad (19)$$

where F is a force exerted by the movable member 28, Ts is a torque exerted by a biasing spring in the counter-rotational direction, Tb is a torque existing on a contacting surface due to the friction, and H is a distance between the optical axis of the rotatable unit 25 and the point of contact on the arm 25a at the ball 23. In the equation (19), one preferred embodiment according to the current invention has the following relation:

$$Ts > Tb \tag{20}$$

when the stepping motor is at rest and the arm 25a presses the movable member 28 at the ball 23. Tb in the equations (19) and (20) is expressed by the following equation:

$$Tb = \mu \cdot N \cdot S \tag{21}$$

where S is a average radius of rotation at the contact surface, N is a force generated by a biasing spring and $\mu$ is a friction coefficient on the contact surface on the arm 25a.

In a preferred embodiment, a required force F in the above equation (19) should be minimized so that a stepping motor is kept minimal in size and consumption and consequently, inexpensive. Although the torque Ts exerted by a biasing spring in the counter-rotational direction be kept minimal to facilitate assembly of the rotational components, the torque Ts should be larger than Tb as indicated in the equation (20). Thus, in a preferred embodiment, the torque Tb is minimized. In relation to the equation (21), in order to precisely rotate the rotatable unit, the radius needs to be sufficiently large, and the biasing spring force N also needs to be large in order to minimize undesirable effects such vibration upon rotation. Consequently, the friction coefficient $\mu$ must be kept small.

In one preferred embodiment, the friction coefficient $\mu$ is determined as follows using the empirically-determined values. The value of N is empirically determined to be larger than 0.3 kgf in order to have consistent contact between the arm and the movable member. It is also determined that the flatness of the contacting surface on the arm 25a needs to be t1=0.03 mm for manufacturing while t2 should be less than ±1.5 mm in order to avoid an optical problem due to eccentricity between the optical axes of a rotatable housing and a light source at a distance d=1 m from the emitting point. Under the above conditions, $$2S > (t1 \times d/t2) = 20 \text{ mm} \tag{22}$$

Thus, S>10 mm. Ts was empirically determined to be less than 1.8 kgf·mm. Based upon the equation (20), to ascertain that Ts is larger than Tb, Ts' is assumed to be smaller by a safety factor of 3.

$$Ts' = Ts/k = 1.8/3 = 0.6 \text{ kgf·mm} \tag{23}$$

Finally, by combining the equations (20) and (21) using the above Ts' in the equation (23), the following equation (24) is obtained:

$$Tb = \mu \cdot N \cdot S < Ts' \tag{24}$$

Therefore, the friction coefficient $\mu$ in the preferred embodiment with the above empirically determined values is less than 0.2 as determined as follows:

$$\mu < Ts'/(N \cdot) = 0.6/(0.3 \times 10) = 0.2 \tag{25}$$

Figure 28A:
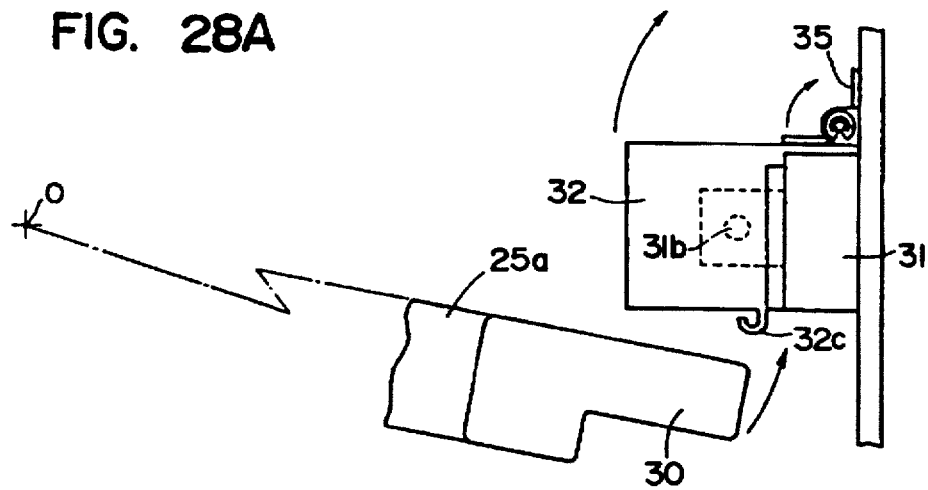
FIGS. 28A and 28B show one embodiment of the non-contacting position detection unit.
Figure 28B:
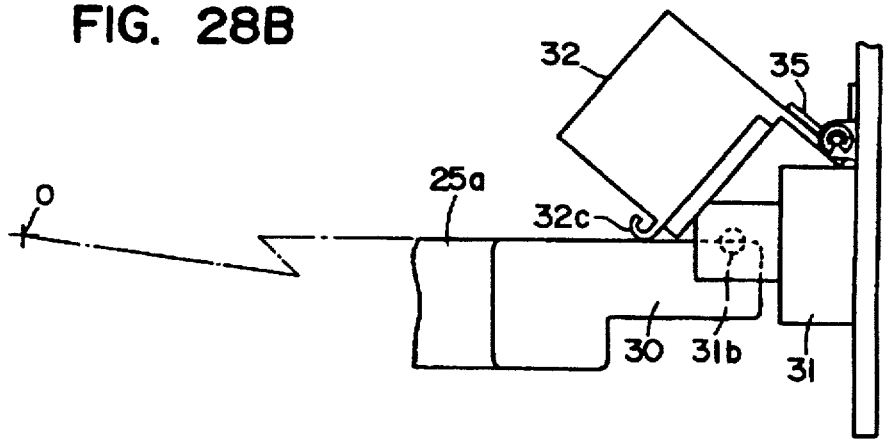
Figure 28C:
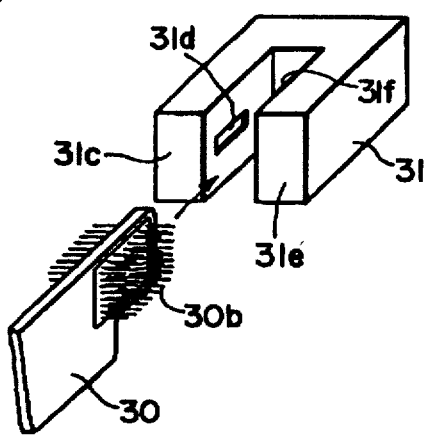
FIG. 28C illustrates an alternative embodiment of the non-contacting positional detection unit.

Referring now to FIGS. 28A and 28B, as an alternative embodiment of the photo sensor switch, the photo sensor 31 is covered by an openable cover 32 to prevent the accumulation of dust and damage. The cover 32 may be biased by a spring 35 to ascertain the closure. The cover 32 is pushed up at a sliding portion 32c by the projection 30 of the arm 25a as the rotatable unit 1 is rotated. Thus, the optical switch 31 is usually covered and exposed only when the projection 30 is rotated to a predetermined position. Referring to FIG. 28C, another embodiment includes a cleaning brush 30b mounted on the projection 30 to clean the photo sensor internal walls 31d and 31f as the projection 30 approaches the inner walls.

Figure 29:
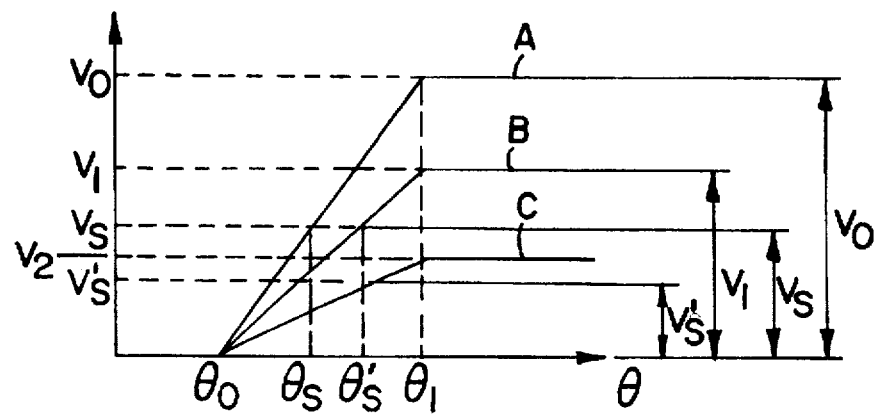
FIG. 29 shows a graph illustrating a sensitivity problem of a non-contacting positional detection unit.

Referring to FIG. 29, an output voltage level of a photo sensor such as a photo transistor in an optical switch is plotted for various angles of a rotatable unit. When the optical switch is clean and free from corrosion and dust, the optical switch generates an output voltage Vo at an angle above an angle $\theta_1$ as shown in a line A. To determine whether the switch is open, the photo sensor output voltage is compared to a predetermined threshold voltage Vs. However, when the optical switch is covered with some dust or corrosion, the sensitivity of the photo sensor is reduced and the output voltage level is consequently reduced as shown in lines B and C. Thus, the comparison of these reduced photo sensor outputs to the same threshold voltage Vs generates an inconsistent switch status. To avoid the inconsistency, a threshold voltage is modified based upon the photo sensor output voltage. In other words, a certain percentage of the maximal output voltage level is used as a threshold voltage.

Figure 30:
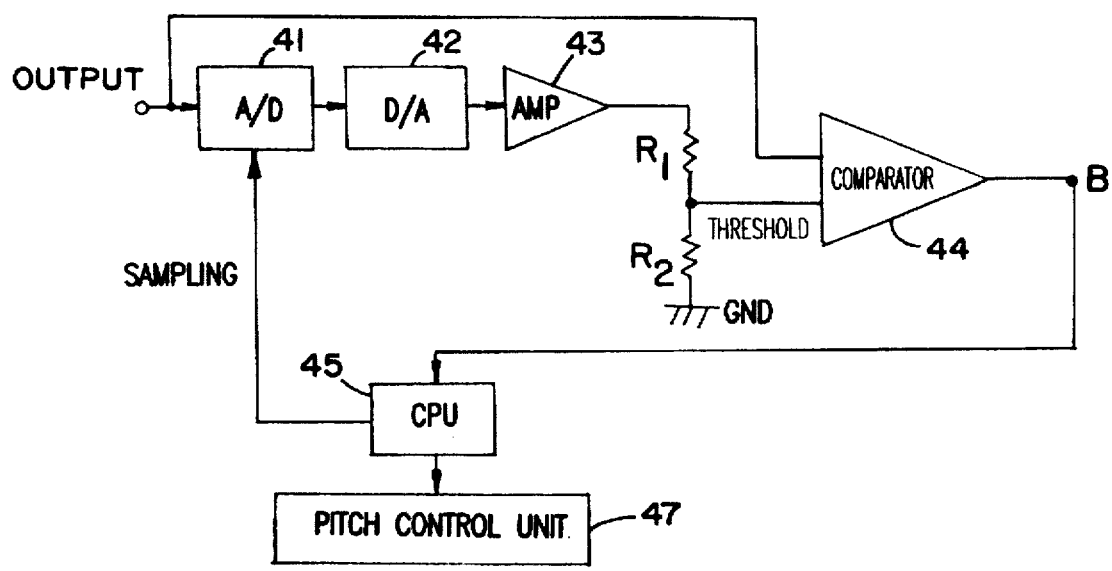
FIG. 30 is a circuit diagram for one preferred embodiment of the adaptable threshold positional detection unit.

Referring to FIG. 30, one preferred embodiment of the above-described adjustable threshold optical switch used in the multi-beam pitch adjustment system includes an analog-to-digital converter 41 and an digital-to-analog converter 43 for sampling an output voltage from a photo sensor in response to a CPU 45. After amplifying the output voltage via an amplifier 43, a voltage divider R1–R2 determines a threshold voltage based upon the amplified output voltage. A comparator 44 compares the sampled voltage and the threshold voltage and generates a comparison signal B to the CPU 45 for ultimately adjusting a sub-scanning pitch by placing a rotatable unit at a desired position via a pitch control unit 47.

Figure 31:
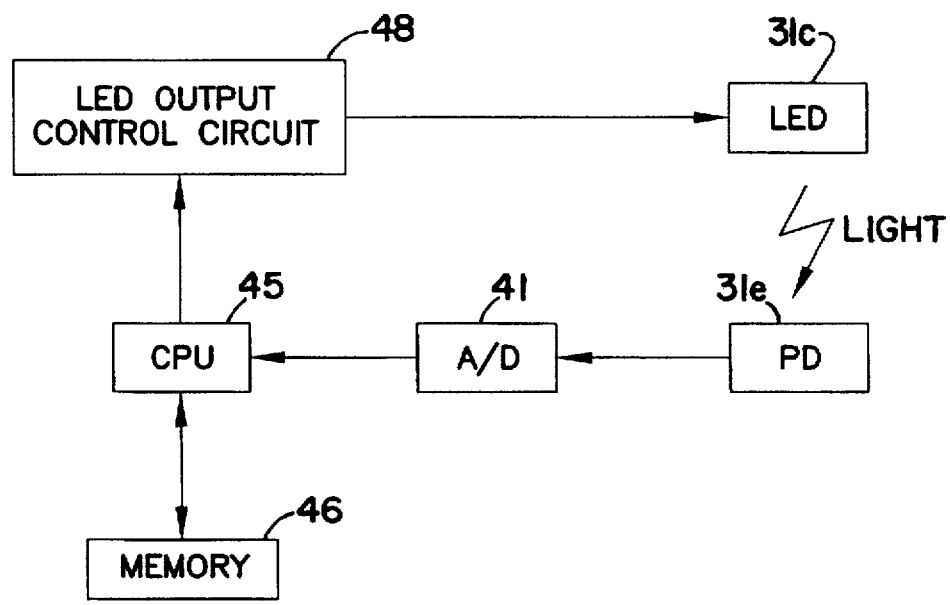
FIG. 31 is a block diagram illustrating another preferred embodiment of the positional detection unit.

Now referring to FIG. 31, another preferred embodiment of the optical switch used in the multi-beam pitch adjustment system includes a light source output control unit 48 for increasing the output intensity level of a light source such as a LED 31c to compensate for the reduced sensitivity of a photo sensor such as a photo diode 31e. The photo diode output is converted to a digital signal by an A/D converter 41 and sent to a CPU 45 for a comparison between the photo diode output and a predetermined value stored in a memory 46. If the comparison indicates that the maximal photo diode output value is below the stored value, the CPU 45 controls the LED output control unit 48 to increase the LED output intensity level so as to maintain the correction function of the photo sensor switch.

In addition to detecting accurate positions of the rotatable unit based upon the above-described photo sensor switches, the rotational positioning units of the multi-beam pitch adjustment system according to the current invention substantially eliminate undesirable effects of the backlash. As described above, since the prior art rotational device has a physically-contacting switch, the rotational unit rotates itself in a predetermined direction to a predetermined initial position, and then rotates itself in an opposite direction to a desired destination position. The rotational components such as a movable member and a motor drive shaft have certain unavoidable idle. Because the directional change and a biasing force are exerted on the rotatable unit, some of the initial movement during the directional change is wasted for overcoming the idle space before rotating the rotatable unit towards the desired position. This backlash leads to an inaccurate positioning of the rotatable unit.

Figure 32:
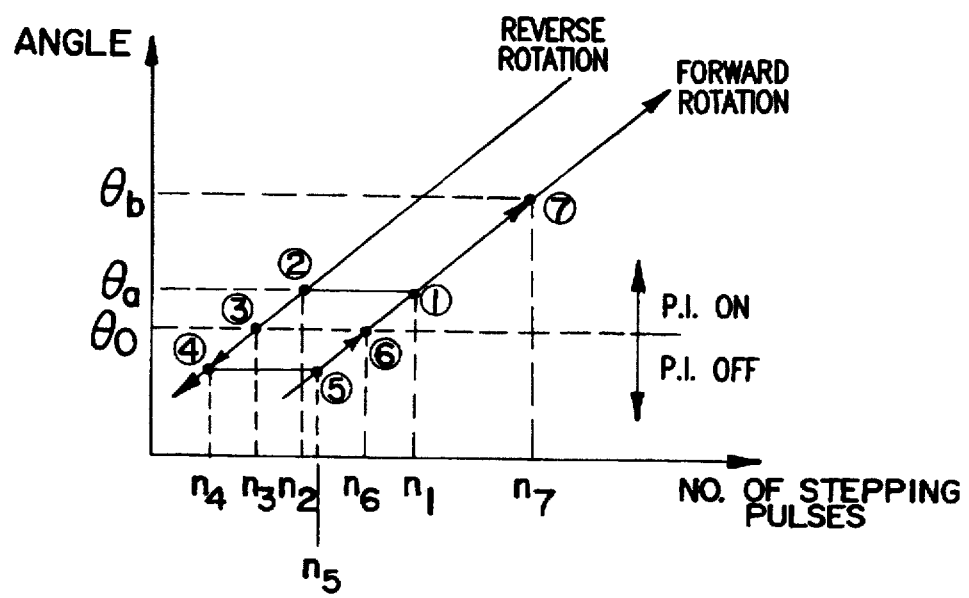
FIG. 32 is a graph illustrating a relation between a number of stepping pulses to a motor and an angle of a rotatable unit in reference to backlash.

To further illustrate the above-described backlash in the multi-beam pitch adjustment system, referring to FIG. 32, a graph shows the relation between the angle of a rotatable unit and the number of pulses delivered to a stepping motor for causing the rotatable unit to rotate. Without the above-described backlash, the number of pulses and the angular position should be perfectly correlated, and a single line should describe the relation regardless of the rotational direction of the rotatable unit. However, because of the above-described backlash, the rotational direction change requires an additional number of stepping pulses to the stepping motor to overcome the idle space. For example, to rotate the rotatable unit from a position 2 at an angle $\theta_a$ to a position 7 at an angle $\theta_b$, assuming that the rotatable unit reached the position 2 by rotating in a reverse direction, first $(n_1-n_2)$ pulses have to be expended on overcoming the backlash in the forward rotation as indicated by a horizontal line from the position 2 to the position 1. Then, $(n_7-n_1)$ pulses are further required for the forward rotation to reach the desired position 7. To consistently reach a desirable destination in a predictable manner, the above-described backlash should be controlled.

Still referring to FIG. 32, a position 6 is a predetermined initial position at an angle $\theta_0$ for eliminating the undesirable backlash effect. At the angle $\theta_0$, the photo sensor or optical switch status changes from on to off and vice versa. For example, in order to move the rotatable unit from a position 1 to a destination 7, according to one preferred process, from the current position 1, the unit is rotated in a reverse direction to reach a position 2 while eliminating the backlash. From position 2, the rotatable unit is still further rotated in the reverse direction until the switch status changes to off and an additional predetermined number of pulses is expended to ascertain the off status in the reverse direction in arriving at position 4. Then, in order to reach the initial position 6, the rotatable unit is now rotated in the forward direction, and approximate $(n_5-n_4)$ initial stepping pulses are expended on eliminating backlash in the forward rotation while reaching a position 5. The forward rotation is continued passed the position 5 by sending one stepping pulse at a time until the switch is in the on status indicating that the rotatable unit is now at the initial position 6 without backlash. Then, $(n_7-n_6)$ stepping pulses precisely cause the rotatable unit to reach the position 7 as expected without the undesirable backlash effect. Although the above-described operation requires additional steps and stepping pulses, since the final step requires only the expected number of stepping pulses, an accurate positioning is accomplished.

Figure 33:
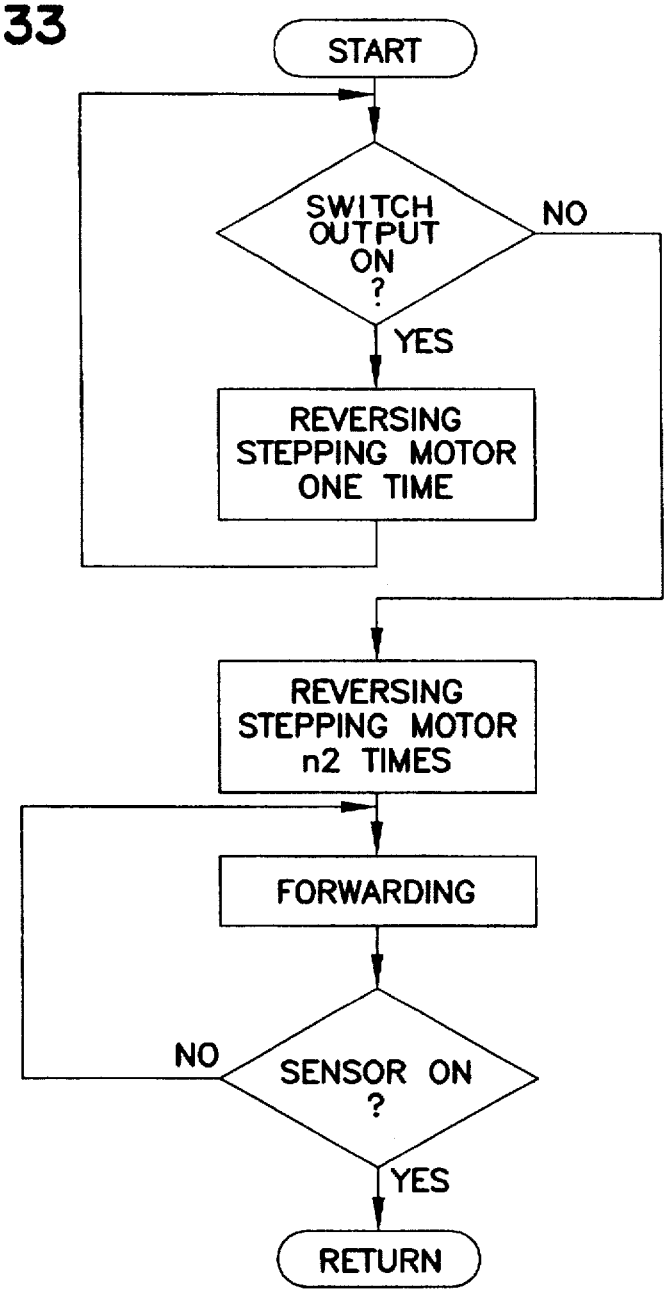
FIG. 33 is a flow chart illustrating steps for substantially eliminating undesirable effects of backlash.

Now referring to FIG. 33, a flow chart summarizes the above-described steps of the one preferred process of substantially eliminating the undesirable effects of the backlash in positioning a rotatable unit at an initial position in order to ultimately adjust a pitch in the multi-beam pitch adjustment system according to the current invention. In this flow chart, a current position is assumed to be between an initial position and a destination position in a forward rotational direction. In a first step, the switch status is checked. If an optical switch status is ON, one stepping pulse is sent to a stepping motor in a reverse direction in a second step and the optical switch status is checked again in the first step. These first and second steps are repeated until the switch status is OFF. Past this OFF status, an additional predetermined number of stepping pulses are sent to rotate the rotatable unit still in the reverse direction in a third step, and in a fourth step, one stepping pulse is sent to the stepping motor now in a forward rotation. In a fifth step, the switch status is checked. If the switch status is OFF, the fourth step is repeated. If the switch status is ON, the initial position is successfully obtained without residual backlash effect.

Figure 34:
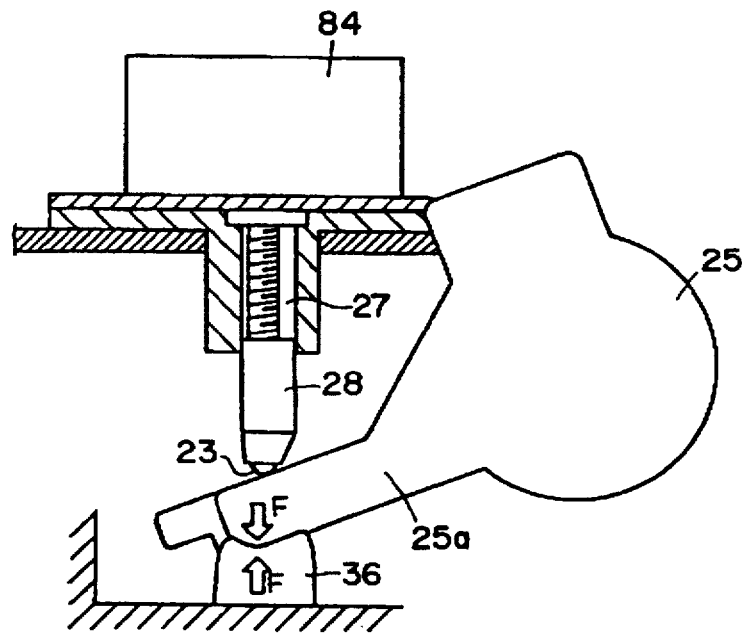
FIG. 34 is a cross-sectional view of a rotation sub-system with one preferred embodiment of the over-run protector.

Now referring to FIG. 34, despite the above-described rotational process and the associated rotational units, when the rotatable unit is accidentally overrun beyond a desirable destination, some safety features are built in the multi-beam pitch adjustment system according to the current invention. One preferred embodiment of the safety feature includes a damper 36 located in a rotational path of an arm 25a beyond a predetermined angle. As described before, a stepping motor 84 rotates its threaded shaft 27 to vertically move a movable member 28. The damper 36 is made of flexible material to absorb the undesirable force exerted by the movable member 28 beyond a point where the movable member 28 is about to completely disengaged from the threaded drive shaft 27 of the stepping motor 84. Since the damper 36 exerts a force against the arm 25 towards the movable member 28, when the movable member 28 is disengaged from the motor shaft 27, the stepping motor 84 is prevented from exerting additional force upon the arm beyond this position while the movable member 28 maintains contact with the threaded shaft 27. After the overrun, because of the maintained contact, when the stepping motor rotates in a reverse direction, the movable member 28 engages the shaft 27 to resume normal operation.

Figure 35:
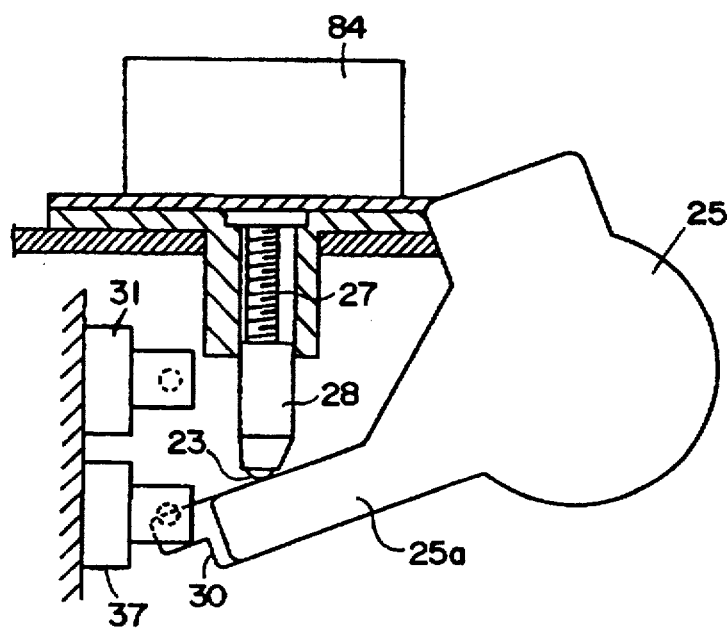
FIG. 35 is a cross-sectional view of a rotation sub-system with another preferred embodiment of the over-run protector.

Referring to FIG. 35, an alternative embodiment of the overrun prevention unit according to the current invention is illustrated. A first non-contacting position detecting unit 31 detects a certain position such as an initial starting position for each positional change. In this alternative embodiment, instead of the above damper, a second non-contacting position detecting unit 37 is placed to prevent a rotatable unit 25 from over-rotating beyond a predetermined angle. The second detecting unit 37 such as a photo sensor switch is positioned at a location where a movable member 28 is about to disengage from a threaded shaft 27 of a stepping motor 84 so that it is interrupted by an opaque portion 30 when the arm 25 is positioned at a predetermined overrun angle. The second photo sensor switch 37 generates a stepping motor deactivation signal in the event of an overrun for temporarily terminating the motor rotation.

Figure 36:
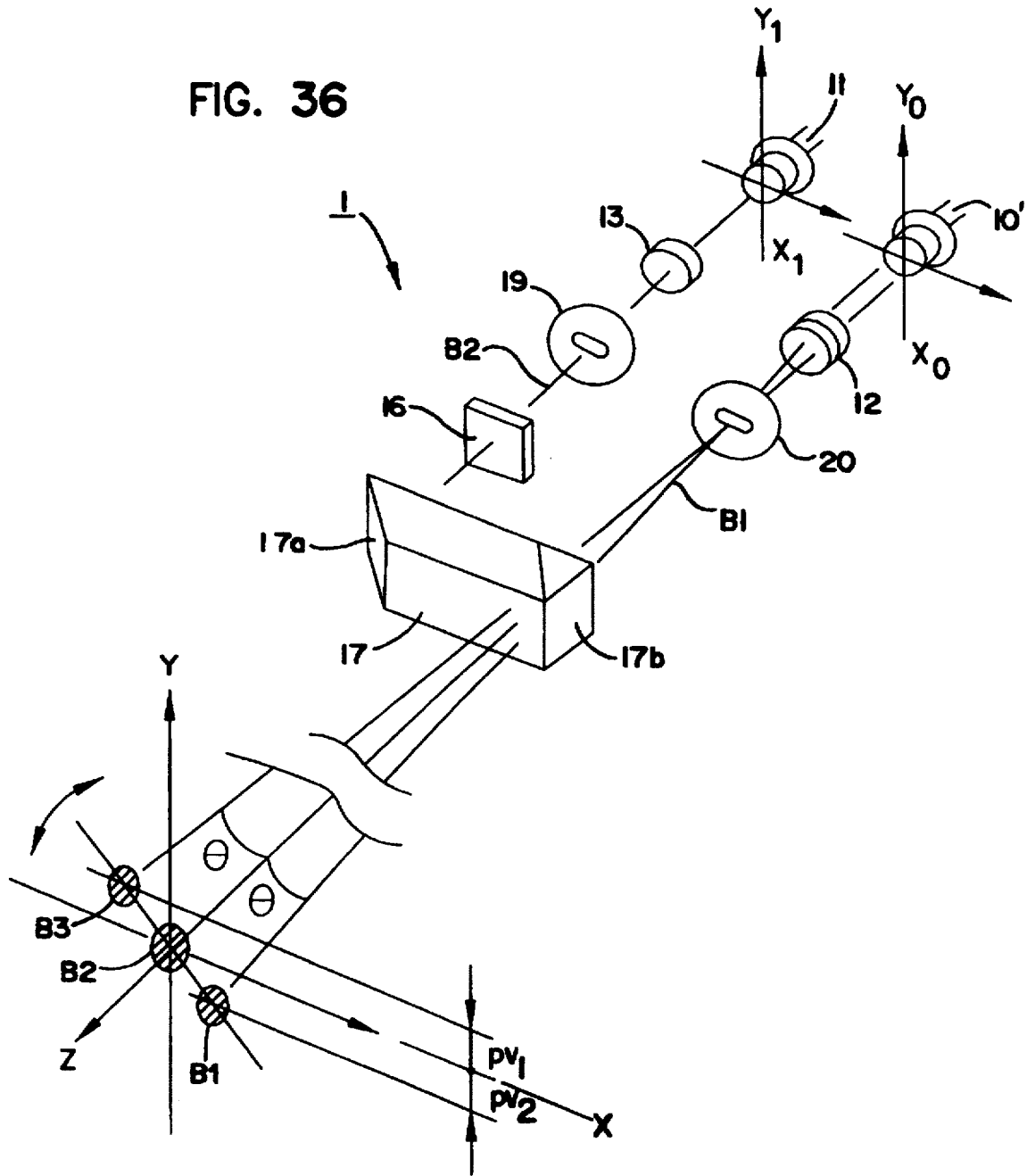
FIG. 36 illustrates one embodiment of the rotatable unit for emitting multiple beams with a varied sub-scanning pitch.

Now referring to FIG. 36, a rotatable unit 1 is similar to one preferred embodiment as illustrated in FIG. 4, and the components with the same reference numbers are substantially identical to those already described in reference to FIG. 4. However, a light source 10' has a predetermined eccentricity with respect to an optical axis Z of a collimator lens 12. The laser emitting diode 10' thus emits beams B1 and B3 which enters a beam splitter 17 and exit without re-directing. Another laser emitting diode 11 has no eccentricity and emits substantially one beam B2 which is polarized by a wave plate 16 before entering the beam splitter 17. Thus, the polarized beam B2 is redirected by the reflecting surfaces 17a and 17b and projects along the optical axis Z. The eccentricity of the laser emitting diode 10' with respect to the optical axis Z is indicated by an angle $\theta_1$ for the beam B3 and an angle $\theta_2$ for the beam B1. These angles $\theta_1$ and $\theta_2$ are substantially identical in one preferred embodiment while they are different in another preferred embodiment according to the current invention. As the rotatable unit 1 is rotated about the optical axis Z as indicated by a double headed arrow, a sub-scanning pitch PV1 and PV2 are adjusted.

Figure 37:
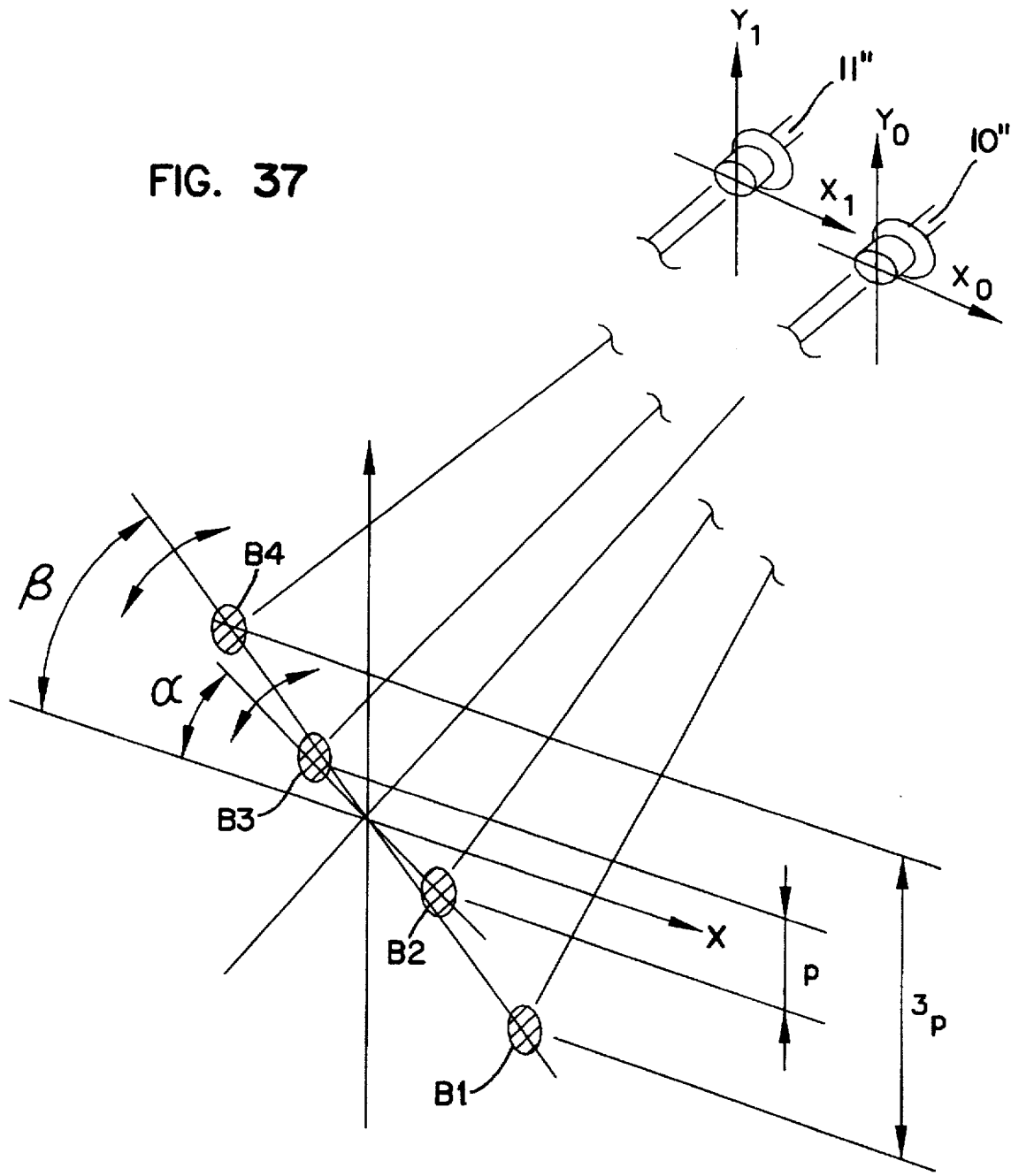
FIG. 37 illustrates another embodiment of the rotatable unit for emitting multiple beams with independently rotatable light emitting sources for adjusting a sub-scanning pitch.

Now referring to FIG. 37, another preferred embodiment of the rotatable unit as used in the multi-beam pitch adjustment system according to the current invention is illustrated. A pair of laser emitting array diodes 10" and 11" each emits a corresponding pair of beams towards an intermediate image-forming surface. Because each of the laser emitting diode arrays 10" and 11" has a different distance between laser emitting elements, the laser beams emitted by these light sources have a distinct distance between the beams on the intermediate image-forming surface. According to one embodiment, two light sources 10" and 11" are independently rotatable, and one light emitting diode 10" emits beams B2 and B3 while the other light emitting diode 11" emits beams B1 and B4. The beams B2 and B3 are at an angle α with respect to a scanning direction X and has a first sub-scanning pitch of P. The beams B1 and B4 are at an angle β with respect to a scanning direction X and has a second sub-scanning pitch of 3P. As the light emitting sources 10" and 11" are independently rotated, the first and second sub-scanning pitch are also independently adjusted. As a result, a third sub-scanning pitch between the beams B1 and B2 and a fourth sub-scanning pitch between the beams B3 and B4 are also adjusted. Although the pairs of beams B2–B3 and B1–B4 share a common axis of rotation in this preferred embodiment, the number of beams and their optical or rotational axes are not limited to those disclosed in the preferred embodiment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of adjusting a pitch between beams on an intermediate image-forming surface, a plurality of light sources being placed in an array on a rotatable unit, comprising the steps of:
   a) emitting a plurality of substantially parallel beams from the light sources;
   b) measuring a distance between said emitted beams; and
   c) automatically rotating the rotatable unit about an axis in parallel to at least one of said emitted beams based upon said measured distance for adjusting the pitch substantially close to a predetermined desired pitch value.

2. The method of adjusting a pitch between beams according to claim 1 wherein said beams are emitted at a predetermined angle with each other so as to have a horizontal distance between said beams in a scanning direction, said scanning direction being a traveling direction of each of said beams on the intermediate image-forming surface, said horizontal distance defining a scanning pitch.

3. The method of adjusting a pitch between beams according to claim 2 wherein in said step c) said predetermined desired pitch value is a predetermined scanning pitch value, the rotatable unit being rotated to maintain said scanning pitch to said predetermined desired scanning pitch value.

4. The method of adjusting a pitch between beams according to claim 1 wherein said step a) emits said beams at a predetermined angle with each other so as to have a vertical distance between said beams in a sub-scanning direction, said sub-scanning direction being perpendicular to said scanning direction, said vertical distance defining a sub-scanning pitch.

5. The method of adjusting a pitch between beams according to claim 4 wherein in said step c) said predetermined desired pitch value is a predetermined sub-scanning pitch value, the rotatable unit being rotated to maintain said sub-scanning pitch to said predetermined desired sub-scanning pitch value.

6. The method of adjusting a pitch between beams according to claim 5 further comprising a step d) of scanning said emitted beams in said scanning direction within a predetermined scanning angle by reflecting the emitted beams on rotatable polygon mirror surfaces.

7. The method of adjusting a pitch between beams according to claim 6 wherein said sub-scanning pitch is measured by using a photo sensor, comprising the following steps of:
   e) emitting only one of the plurality of the beams at a time so as to reach the photo sensor;
   f) detecting a first vertical position of said one beam on the photo sensor;
   g) emitting another of the plurality of the beams at a time so as to reach the photo sensor;
   h) detecting a second vertical position of said another beam on the photo sensor; and
   i) determining said sub-scanning pitch based upon said first vertical position and said second vertical position, said sub-scanning pitch defining a measured sub-scanning pitch.

8. The method of adjusting a pitch between beams according to claim 7 wherein following each of said steps e) and g), each of the emitted beams is directed to enlarge said sub-scanning pitch by a predetermined magnification factor, said sub-scanning pitch defining a magnified sub-scanning pitch, said measured sub-scanning pitch in said step i) being determined by proportionately adjusting said measured sub-scanning pitch based upon said magnification factor.

9. The method of adjusting a pitch between beams according to claim 7 wherein said one beam is scanned by a first group of the polygon mirror surfaces while said another beam is scanned by a second group of the polygon mirror surfaces.

10. The method of adjusting a pitch between beams according to claim 7 wherein said one beam and said another beam are separately scanned by a common one of the polygon mirror surfaces.

11. The method of adjusting a pitch between beams according to claim 7 wherein said steps f) and h) respectively average said detected first vertical positions and said detected second vertical positions by determining a center of distribution for each beam.

12. The method of adjusting a pitch between beams according to claim 7 wherein said step c) further includes additional steps:
   j) determining a correction distance based upon said predetermined desired sub-scanning pitch value and said measured sub-scanning pitch; and
   k) converting said correction distance to a correction angle for rotating the rotatable unit.

13. The method of adjusting a pitch between beams according to claim 12 wherein said step k) is accomplished by using a predetermined distance-to-angle conversion table.

14. The method of adjusting a pitch between beams according to claim 12 wherein said step k) is accomplished by using the following equation:

said correction angle=sin⁻¹(said correction distance)/square root of { (said scanning pitch)²+said measured sub-scanning pitch)²}.

15. The method of adjusting a pitch between beams according to claim 12 wherein the rotatable unit is rotated by a stepping motor, said correction angle is further converted into a number of pulses for activating the stepping motor.

16. The method of adjusting a pitch between beams according to claim 15 wherein said step c) further includes additional steps:

l) determining a correction distance based upon said predetermined desired sub-scanning pitch value and said calculated sub-scanning pitch; and m) converting said correction distance to a correction angle for rotating the rotatable unit using said scanning pitch.

17. The method of adjusting a pitch between beams according to claim 7, further comprising the following steps:

n) placing a photo sensor outside a path of the beams before said step e); and o) directing each of the beams towards the photo sensor after each of said steps e) and g).

18. The method of adjusting a pitch between beams according to claim 6 wherein said sub-scanning pitch is measured by using a pair of photo sensors, comprising the following steps:

p) placing a first photo sensor at a first predetermined angle with respect to said sub-scanning direction;

q) placing a second photo sensor at a second predetermined angle with respect to said sub-scanning direction;

r) simultaneously scanning at least a first beam and a second beam in said scanning direction at a predetermined scanning velocity with a predetermined horizontal scanning pitch;

s) determining a first time differential between said first beam and said second beam in arriving at the second photo sensor;

t) determining a second time differential between said first beam and said second beam in arriving at the second photo sensor; and u) determining said sub-scanning pitch based upon said first time differential and said second time differential, said sub-scanning pitch defining a measured sub-scanning pitch.

19. The method of adjusting a pitch between said beams according to claim 18 further comprising a step v) of running a standard clock pulse and a series of phase-adjusted clock pulses, in said steps s) and t) said first time differential and said second time differential are determined based upon said standard clock pulse and said phase-adjusted clock pulses.

20. The method of adjusting a pitch between beams according to claim 18 wherein said first predetermined angle is zero, said first photo sensor having an edge and said edge being in parallel to said sub-scanning direction.

21. The method of adjusting a pitch between beams according to claim 18 wherein said step c) further includes additional steps of:

w) determining a correction distance based upon predetermined desired sub-scanning pitch value and said sub-scanning pitch determined in said step u); and x) converting said correction distance to a correction angle for rotating the rotatable unit using said sub-scanning pitch.

22. The method of adjusting a pitch between beams according to claim 6 wherein said sub-scanning pitch is measured by using at least one photo sensor, comprising the following steps:

y) placing a first photo sensor having at least three edges whose a pair of edges respectively form a predetermined first angle and a predetermined second angle with respect to said sub-scanning direction, a first distance being defined between the pair of edges in said sub-scanning direction, a second distance other than said first distance being defined between the pair of edges in said sub-scanning direction;

z) simultaneously scanning at least a first beam and a second beam in said scanning direction at a common predetermined scanning velocity with a predetermined horizontal scanning pitch, said first beam being scanned over said first distance, said second beam being scanned over said second distance;

a') measuring a first duration for said first beam to be scanned said first distance;

b') measuring a second duration for said second beam to be scanned over said second distance; and c') determining said sub-scanning pitch based upon said first duration and said second duration, said sub-scanning pitch defining a measured sub-scanning pitch.

23. The method of adjusting a pitch between said beams according to claim 22 further comprising a step d') of running a standard clock pulse, wherein in said steps a') and b') said first duration and said second duration are determined based upon said standard clock pulse.

24. The method of adjusting a pitch between beams according to claim 22 wherein said step c) further includes additional steps:

e') determining a correction distance based upon said predetermined desired sub-scanning pitch value and said sub-scanning pitch determined in said step c'); and f') converting said correction distance to a correction angle for rotating the rotatable unit using said scanning pitch.

25. The method of adjusting a pitch between beams according to claim 22 wherein in said step y), a second photo sensor is placed near said first photo sensor in said scanning direction, said second photo sensor being substantially identical to said first photo sensor.

26. The method of adjusting a pitch between beams according to claim 25 wherein in said step z) said first beam is directed towards said first photo sensor, said second beam being directed towards said second photo sensor.

27. The method of adjusting a pitch between beams according to claim 1 wherein in said step c) the rotatable unit is rotated by a movable member driven by a stepping motor and said step c) further comprises the following steps of:

g') moving the movable member which contacts a predetermined location on the rotatable unit to cause the rotatable unit to rotate; and h') sending a number of pulsing signals to the stepping motor for moving the movable unit so as to rotate the rotable unit in a predetermined rotational direction.

28. The method of adjusting a pitch between beams according to claim 27 wherein in said step g') said movable member is initially moved to a predetermined position, said movable member being moved from said predetermined position in response to said number of pulsing signals to the stepping motor for substantially preventing an undesirable effect of backlash in rotating the rotatable unit in a single rotational direction.

29. The method of adjusting a pitch between beams according to claim 28 further comprising an additional step i') of biasing the rotatable unit in a direction opposite to said rotational direction.

30. The method of adjusting a pitch between beams according to claim 27 further comprising an additional step j') of preventing the rotatable unit from being over rotated beyond a predetermined angle.

31. The method of adjusting a pitch between beams according to claim 1 further comprising an additional step k') of detecting an angle of the rotatable unit.

32. The method of adjusting a pitch between beams according to claim 31 wherein the rotatable unit having a projection portion for causing a photo-sensor switch to detect a change and said step k') further comprising the following steps of:

l') placing the photo-sensor switch at a predetermined angle with respect to said projection portion of the rotatable unit;

m') rotating said projection portion to cause the photo-sensor switch to detect the chance; and n') generating an angle signal when the photo-sensor switch detects the chance.

33. The method of adjusting a pitch between beams according to claim 32 further comprising a step o') of maintaining the photo-sensor switch to be free from dust and corrosion.

34. The method of adjusting a pitch between beams according to claim 32 further comprising a step p') of adjusting a sensitivity level of the photo-sensor switch.

35. The method of adjusting a pitch between beams according to claim 1 further comprising the following steps of:

g') selecting an initial pitch between the beams in a sub-scanning direction before said step a), the beams each having an optical axis; and r') rotating the rotatable unit about an axis in parallel to at least one of said optical axes for initializing said pitch at said selected initial pitch.

36. A method of selecting a pitch between a pair of beams on an intermediate image-forming surface, a plurality of light sources each emitting at least one beam along an optical axis, comprising the steps of:

s') selecting a pair of adjacent beams emitted by a common light source;

t') independently selecting a desired pitch distance between said selected pair of said adjacent beams; and u') rotating said common light source about an axis in parallel to at least one of said optical axes in response to the selected pitch distance for initializing the pitch at said selected pitch distance.

37. A method of adjusting a pitch between a pair of beams on an intermediate image-forming surface, a plurality of light sources each emitting at least one beam, comprising the steps of:

v') emitting a plurality of beams;

w') selecting a pair of adjacent beams emitted from a single one of said light sources;

x') measuring the pitch between said emitted beams in a sub-scanning direction; and y') rotating said single light source about an axis in parallel to at least one of said emitted beams based upon the measured pitch for maintaining a predetermined desired pitch.

38. A system for adjusting a pitch between beams on an intermediate image-forming surface, comprising:

a rotatable unit having a plurality of light sources placed in a single array, said light sources emitting a plurality of substantially parallel beams;

a pitch measuring unit for measuring a pitch distance between said emitted beams, said pitch measuring unit generating a pitch signal indicative of the pitch distance; and a rotation control unit in response to the pitch signal causing said rotatable unit to rotate about an axis in parallel to at least one of the emitted beams for adjusting the pitch substantially close to a predetermined desired pitch value.

39. The system for adjusting a pitch between beams according to claim 38 wherein said light sources emit the beams with a horizontal distance between said beams in a scanning direction, said scanning direction being a traveling direction of each of said beams on the intermediate image-forming surface, said horizontal distance defining a scanning pitch.

40. The system for adjusting a pitch between beams according to claim 39 wherein said rotation control unit causes said rotatable unit to rotate so as to adjust said scanning pitch substantially close to said predetermined desired pitch value.

41. The system for adjusting a pitch between beams according to claim 39 wherein said light sources emit said beams with a vertical distance between said beams in a sub-scanning direction, said sub-scanning direction being perpendicular to said scanning direction, said vertical distance defining a sub-scanning pitch.

42. The system for adjusting a pitch between beams according to claim 41 wherein said rotation control unit causes said rotatable unit to rotate in order to adjust said sub-scanning pitch substantially close to said predetermined desired pitch value.

43. The system for adjusting a pitch between beams according to claim 42 further comprising a scanning unit having rotatable reflecting surfaces for scanning said emitted beams in said scanning direction within a predetermined scanning angle.

44. The system for adjusting a pitch between beams according to claim 43 wherein said pitch measuring unit further comprises:

a light source control unit for causing each of said light sources to emit only a single beam at a time in a sequential manner, each beam having a predetermined light path towards the intermediate image-forming surface;

a photo sensor for detecting a first vertical position of one of said beams on said photo sensor, said photo sensor also detecting a second vertical position of another of said beam on said photo sensor; and a pitch calculation unit connected to said photo sensor for determining said sub-scanning pitch based upon said first vertical position and said second vertical position, said pitch calculation unit generating a measured sub-scanning pitch signal indicative of said sub-scanning pitch.

45. The system for adjusting a pitch between beams according to claim 44 further comprising:

a magnification unit for directing each of the emitted beams so as to enlarge said sub-scanning pitch by a predetermined magnification factor, said enlarged sub-scanning pitch defining a magnified sub-scanning pitch, wherein said pitch calculation unit proportionately adjusts said magnified sub-scanning pitch by said magnification factor.

46. The system for adjusting a pitch between beams according to any one of claims 8 and 45 wherein said magnification unit includes a lens placed in the light path.

47. The system for adjusting a pitch between beams according to claim 44 wherein said light source control unit controls the light sources so that said scanning unit scans said one beam by a first group of said reflecting surfaces while said scanning unit scans said another beam by a second group of said reflecting surfaces.

48. The system for adjusting a pitch between beams according to claim 44 wherein said light source control unit controls the light sources so that said scanning unit scans said one beam and said another beam by a common one of said reflecting surfaces.

49. The system for adjusting a pitch between beams according to claim 44 wherein said pitch calculation unit further comprises a center distribution unit for respectively averaging said detected first positions and said detected second positions for determining a center of distribution for each beam.

50. The system for adjusting a pitch between beams according to claim 44 wherein said rotation control unit further comprises:

a pitch correction unit connected to said pitch calculation unit for determining a correction distance based upon said predetermined desired pitch value and said measured sub-scanning pitch signal;

an angular conversion unit connected to said pitch correction unit for converting said correction distance to a correction angle;

a stepping motor having a movable member for contacting said rotatable unit, said movable member causing said rotatable unit to rotate; and a motor control unit connected to said angular conversion unit and said stepping motor for generating a number of pulses based upon the correction angle and sending the pulses to said stepping motor.

51. The system for adjusting a pitch between beams according to claim 50 wherein said angular conversion unit converts said correction distance to said correction angle based upon a predetermined distance-to-angle conversion table.

52. The system for adjusting a pitch between beams according to claim 50 wherein said angular conversion unit calculates said correction angle using a following equation:

$$\text{said correction angle} = \sin^{-1}(\text{said correction distance})/\text{square root of } \{(\text{said scanning pitch})^2 + \text{said measured sub-scanning pitch})^2\}.$$

53. The system for adjusting a pitch between beams according to claim 44 wherein said photo sensor is placed outside the light path of the beams, the system further comprising a light directing unit for directing each of the beams toward said photo sensor.

54. The system for adjusting a pitch between beams according to claim 43 wherein said pitch measuring unit further comprises:

a light source control unit for causing each of the light sources to simultaneously emit said beams including a first beam and a second beam, each beam having a predetermined light path towards the intermediate image-forming surface;

said scanning unit located along said light path for simultaneously scanning said beams in said scanning direction at a predetermined scanning velocity with a predetermined horizontal scanning pitch;

a first photo sensor located at a first predetermined angle with respect to said sub-scanning direction for detecting a first time differential between said first beam and said second beam in arriving at the first photo sensor;

a second photo sensor located at a second predetermined angle with respect to said sub-scanning direction for detecting a second time differential between said first beam and said second beam in arriving at the second photo sensor, said second photo sensor being substantially identical to said first photo sensor; and a pitch calculation unit connected to said first and second photo sensors for determining said sub-scanning pitch based upon said first time differential and said second time differential, said sub-scanning pitch defining a measured sub-scanning pitch, said pitch calculation unit generating a measured sub-scanning pitch signal indicative of said sub-scanning pitch.

55. The system for adjusting a pitch between beams according to claim 54 wherein said pitch calculation unit further comprises a clock pulse generation unit for generating a standard clock pulse and a series of phase-adjusted clock pulses, said pitch calculation unit calculating said first time differential and said second time differential based upon said standard clock pulse and said phase-adjusted clock pulses.

56. The system for adjusting a pitch between beams according to claim 54 wherein said first predetermined angle is zero, said first photo sensor having an edge and said edge being in parallel to said sub-scanning direction.

57. The system for adjusting a pitch between beams according to claim 54 wherein said rotation control unit further comprises:

a pitch correction unit connected to said pitch calculation unit for determining a correction distance based upon said predetermined desired pitch value and said measured sub-scanning pitch signal;

an angular conversion unit connected to said pitch correction unit for converting said correction distance to a correction angle;

a stepping motor having a movable member for contacting said rotatable unit, said movable member causing said rotatable unit to rotate; and a motor control unit connected to said angular conversion unit and said stepping motor for generating a number of pulses based upon the correction angle and sending the pulses to said stepping motor.

58. The system for adjusting a pitch between beams according to claim 43 wherein said pitch measuring unit further comprises:

a light source control unit for causing each of the light sources to simultaneously emit said beams including a first beam and a second beam, each beam having a predetermined light path toward the intermediate image-forming surface;

said scanning unit located along said light path for simultaneously scanning said beams in said scanning direction at a predetermined scanning velocity with a predetermined horizontal scanning pitch;

a first photo sensor having at least three edges whose a pair of edges respectively form a predetermined first angle and a predetermined second angle with respect to said sub-scanning direction, a first distance being defined between said edges in said sub-scanning direction, a second distance other than said first distance being defined between said edges in said sub-scanning direction, said first photo sensor detecting a first duration for said first beam to be scanned over said first distance, said first photo sensor detecting a second duration for said second beam to be scanned over said second distance; and a pitch calculation unit connected to said first photo sensor for determining said sub-scanning pitch based upon said first duration and said second duration, said sub-scanning pitch defining a measured sub-scanning pitch, said pitch calculation unit generating a measured sub-scanning pitch signal indicative of said measured sub-scanning pitch.

59. The system for adjusting a pitch between beams according to claim 58 wherein said pitch calculation unit further comprises a clock pulse generation unit for generating a standard clock pulse and a series of phase-adjusted clock pulses, said pitch calculation unit calculating said first time differential and said second time differential based upon said standard clock pulse and said phase-adjusted clock pulses.

60. The system for adjusting a pitch between beams according to claim 58 wherein said first photo sensor is trapezoidal in shape.

61. The system for adjusting a pitch between beams according to claim 58 further comprising:
a second photo sensor placed near said first photo sensor in said sub-scanning direction, said second photo sensor being substantially identical to said first photo sensor; and
a beam direction unit for directing said first beam towards said first photo sensor while directing said second beam towards said second photo sensor.

62. The system for adjusting a pitch between beams according to claim 58 wherein said rotation control unit further comprises:
a pitch correction unit connected to said pitch calculation unit for determining a correction distance based upon said predetermined desired pitch value and said measured sub-scanning pitch signal;
an angular conversion unit connected to said pitch correction unit for converting said correction distance to a correction angle;
a stepping motor having a movable member for contacting said rotatable unit, said movable member causing said rotatable unit to rotate; and
a motor control unit connected to said angular conversion unit and said stepping motor for generating a number of pulses based upon the correction angle and sending the pulses to said stepping motor.

63. The system for adjusting a pitch between beams according to claim 42 wherein said rotatable unit has an outer surface and an arm projecting from said outer surface away from a rotational center of said rotatable unit, said arm having a predetermined rotational distance, said rotation control unit including a movable member contacting said arm for causing said rotatable unit to rotate in a predetermined rotational direction so as to adjust said sub-scanning pitch substantially close to said predetermined desired pitch value.

64. The system for adjusting a pitch between beams according to claim 63 wherein said movable member is initially moved to a predetermined starting position, said movable member being moved from said predetermined starting position in response to said rotation control unit for substantially preventing an undesirable effect of backlash in rotating the rotatable unit in said single rotational direction.

65. The system for adjusting a pitch between beams according to claim 64 further comprising a biasing member for biasing said rotatable unit in a direction opposite to said rotational direction.

66. The system for adjusting a pitch between beams according to claim 64 further comprising a damper located within said rotational distance of said arm and at a predetermined angle with respect to said rotational unit for preventing said rotatable unit from being over rotated beyond said predetermined angle.

67. The system for adjusting a pitch between beams according to claim 64 further comprising a photo-sensor switch located within said rotational distance at a predetermined angle with respect to said rotatable unit, said arm having a light intransmissive portion for opening said photo-sensor switch when said arm reaches said predetermined angle.

68. The system for adjusting a pitch between beams according to claim 67 wherein said photo-sensor switch includes a cover portion for movably covering said photo-sensor switch.

69. The system for adjusting a pitch between beams according to claim 67 wherein said photo-sensor switch has a photo sensor for outputting an output voltage up to a maximal output voltage, a voltage divider for adjustably determining a threshold voltage based upon the maximal output voltage and a comparator for determining a status of said photo-sensor switch based upon a comparison between the threshold voltage and the output voltage.

70. The system for adjusting a pitch between beams according to claim 67 wherein said photo-sensor switch has an adjustable light source for adjusting a sensitivity level of said photo-sensor switch.

71. The system for adjusting a pitch between beams according to claim 38 further comprising:
a pitch selection unit for selecting an initial pitch between the beams in a sub-scanning direction, the beams each having an optical axis, said pitch selection unit generating a pitch signal indicative of said initial pitch.

72. A system for selecting a pitch between a pair of beams on an intermediate image-forming surface, comprising:
a plurality of individually rotatable light sources each emitting at least one beam, a center of said emitted beams being located along an optical axis;
a pitch control unit for selecting a pair of adjacent beams emitted by a common light source and a desired pitch distance between said selected pair of said adjacent beams; and
a rotation control unit for rotating said common light source about an axis in parallel to at least one of said optical axes in response to the selected pitch distance for initializing the pitch at said selected pitch distance.

73. The system for selecting a pitch between a pair of beams on an intermediate image-forming surface according to claim 72 wherein said light sources have a predetermined angle to emit light in a plurality of beams.

74. A system for adjusting a pitch between a pair of beams on an intermediate image-forming surface, comprising:
a plurality of individually rotatable light sources each emitting at least one beam, a center of said emitted beams being located along an optical axis;
a pitch measuring unit for measuring a pitch between a pair of adjacent beams emitted by a common light source; and
a rotation control unit for rotating said common light source about an axis in parallel to at least one of said optical axes based upon the measured pitch for adjusting said measured pitch substantially close to a predetermined desired pitch.

* * * * *